United States Patent
Kobayashi et al.

[11] Patent Number: 5,901,262
[45] Date of Patent: May 4, 1999

[54] OPTICAL COUPLING MODULE AND METHOD FOR PRODUCING THE SAME

[75] Inventors: Yasuhiro Kobayashi, Osaka; Kenichi Matsuda, Moriguchi, both of Japan

[73] Assignee: Matsushita Electric Industrial Co., Ltd., Osaka, Japan

[21] Appl. No.: 08/944,522

[22] Filed: Oct. 6, 1997

Related U.S. Application Data

[62] Division of application No. 08/705,428, Aug. 29, 1996, Pat. No. 5,742,720.

[30] Foreign Application Priority Data

Aug. 30, 1995 [JP] Japan .................................. 7-221336

[51] Int. Cl.$^6$ ...................................................... G02B 6/36
[52] U.S. Cl. ............................ 385/89; 385/147; 385/93; 385/80; 385/83
[58] Field of Search ............................ 385/147, 65, 83, 385/49, 89, 80, 93

[56] References Cited

U.S. PATENT DOCUMENTS

| | | | |
|---|---|---|---|
| 5,082,346 | 1/1992 | Myers | 385/65 |
| 5,434,939 | 7/1995 | Matsuda | 385/88 |

FOREIGN PATENT DOCUMENTS

| | | |
|---|---|---|
| 3605966 | 8/1987 | Germany . |
| 56-30112 | 3/1981 | Japan . |
| 59-153520 | 10/1984 | Japan . |
| 60-120408 | 8/1985 | Japan . |
| 61-134710 | 6/1986 | Japan . |
| 63-54112 | 4/1988 | Japan . |
| 63-226607 | 9/1988 | Japan . |
| 3-148612 | 6/1991 | Japan . |
| 5-11107 | 2/1993 | Japan . |
| 5-196842 | 8/1993 | Japan . |
| 6-34853 | 2/1994 | Japan . |
| 6-237016 | 8/1994 | Japan . |

*Primary Examiner*—Hung N. Ngo
*Attorney, Agent, or Firm*—Ratner & Prestia

[57] ABSTRACT

Mutually parallel V grooves are formed on the upper surface of a first support member of an optical fiber array ferrule, and then an optical fiber wire is disposed in each of the V grooves. Stacked thereon is a second support member having V grooves formed on both the upper and lower surfaces thereof so as to oppose each other, the V grooves on the lower surface serving as guiding grooves. An optical fiber wire is also disposed in each of the V grooves on the upper surface of the second support member. Further stacked thereon is a third support member having V grooves formed on the lower surface thereof, so that an optical fiber array ferrule is configured. The optical fiber array ferrule as well as a surface emitting laser array are mounted on a single substrate so that an optical coupling module is configured.

11 Claims, 15 Drawing Sheets

OPTICAL COUPLING MODULE AND METHOD FOR PRODUCING THE SAME

This application is a division of application Ser. No. 08/705,428, filed Aug. 29, 1996, now U.S. Pat. No. 5,142,720.

BACKGROUND OF THE INVENTION

1. Field of the Invention

The present invention relates to an optical coupling module which realizes a coupling between a two-dimensional surface emitting laser array and a two-dimensional optical fiber array, and to a method of producing the same.

2. Description of the Related Art

With a growing interest in optical interconnection, much effort is being made toward the development of parallel optical transmission using a semiconductor laser array (hereinafter, also referred to simply as "a laser array"). In particular, a parallel optical transmission using a surface emitting semiconductor laser (hereinafter, also referred to simply as "a surface emitting laser") as a light source is receiving much attention, and research and development in this area are being conducted vigorously. The reason is that the surface emitting laser, for example, a vertical cavity type surface emitting laser, has characteristics suited for the light source for parallel optical transmissions. For example, it can be integrated into a high density two-dimensional laser array. The characteristics also include low power consumption and low production cost. Moreover, since the emitted beam is circular in shape, it can readily be combined with optical fibers.

A conventional optical coupling module which can be used for the parallel optical transmission is typically constituted of a one dimensional semiconductor laser array and a one dimensional optical fiber array combined together as disclosed, for example, in Japanese Laid-Open Patent Publication No. 6-34853. FIG. 13 illustrates the structure of the conventional optical coupling module 1300 disclosed in the above-mentioned publication.

The conventional optical coupling module 1300 has a one dimensional semiconductor laser array 1302 and a plurality of parallel V grooves 1303, both formed on a silicon substrate 1301. The V grooves 1303 are aligned such that the location of each V groove corresponds to one of the laser devices included in the semiconductor laser array 1302. The semiconductor laser array 1302 may be formed separately and installed later on the silicon substrate 1301. Each optical fiber wire 1305 included in a multi-wire optical fiber tape 1304 is disposed in each of the V grooves 1303 and secured with an adhesive agent. This realizes optical coupling between the laser devices included in the semiconductor laser array 1302 and the optical fiber wires 1305 included in the optical fiber tape 1304.

However, when a two-dimensional surface emitting semiconductor laser array is involved, the above-described conventional structure cannot realize optical coupling between all laser devices included in the laser array and optical fiber wires included in the optical fiber tape. Moreover, in order to arrange the optical fiber tape in such a manner that the tape is parallel with the substrate while mounting both the optical fiber tape and the two-dimensional surface emitting semiconductor laser array on the same substrate, it is necessary to mount the laser array on the substrate such that it is perpendicular to the substrate. Such mounting, however, is practically difficult.

Furthermore, a plurality of silicon substrates having the V grooves of the above-described conventional structure can be stacked with one on the top of another for multiple layers and vertically placed in contact with the two-dimensional surface emitting semiconductor laser array mounted on another substrate in an attempt to achieve optical coupling between laser devices included in the laser array and optical fiber wires. However, since the V grooves formed on each substrate become easily misaligned in the horizontal direction upon stacking, it is difficult to accurately match each optical fiber wire included in the optical fiber tape to the corresponding laser device included in the two-dimensional surface emitting laser array.

On the other hand, Japanese Laid-Open Patent Publication No. 6-237016, which corresponds to U.S. Pat. No. 5,434,939, proposes a module which has a structure including guiding holes formed in the substrate having a two-dimensional surface emitting laser array formed thereon, the location of the guiding hole corresponding to one of the laser devices included in the laser array. The optical fibers are then inserted in the guiding holes for optical coupling with the laser device. However, this structure cannot ensure sufficiently strong coupling strength since the optical fibers are simply inserted into the guiding holes. Moreover, in a case where the number of laser devices included in the laser array is large, the number of optical fibers to be coupled is also large, which means that the number of couplings increases and the efficient attainment of optical coupling becomes difficult.

SUMMARY OF THE INVENTION

In accordance with one aspect of the present invention, an optical coupling module including an optical fiber array ferrule is provided. The optical fiber array ferrule includes: a first support member having a first lower surface and a first upper surface which are parallel to each other, at least the first upper surface being provided with a first V groove group including a plurality of mutually parallel V grooves; a second support member having a second lower surface and a second upper surface which are parallel to each other, the second lower surface being provided with a second V groove group including a plurality of mutually parallel V grooves, the second upper surface being provided with a third V groove group including a plurality of mutually parallel V grooves, and the second support member being disposed above the first support member; a third support member having a third lower surface and a third upper surface which are parallel to each other, at least the third lower surface being provided with a fourth V groove group including a plurality of mutually parallel V grooves, and the third support member being disposed above the second support member; and a plurality of optical fiber wires, each of which is disposed in one of the V grooves of the first and third groove groups. A pitch between any two neighboring V grooves of the first, second, third and fourth V groove groups is the same. Each V groove of the second V groove group corresponds to, and is in contact with, the optical fiber wire disposed in one of the V grooves of the first V groove group. Each V groove of the fourth V groove group corresponds to, and is in contact with, the optical fiber wire disposed in one of the V grooves of the third V groove group.

In accordance with another aspect of the present invention, a method for producing an optical coupling module including an optical fiber array ferrule is provided. The method includes the steps for forming the optical fiber array ferrule, which includes the step of preparing a first support member having a first lower surface and a first upper surface which are parallel to each other, a second support member having a second lower surface and a second upper surface which are parallel to each other, and a third support member having a third lower surface and a third upper surface which are parallel to each other. The method further includes the step of providing at least the first upper surface, the second lower surface, the second upper surface and the third lower surface with a first, second, third and fourth V groove groups, respectively, each including a plurality of mutually parallel V grooves, in such a manner that the V grooves have the same pitch. The method further includes the steps of: disposing each of a plurality of optical fiber wires in one of the V grooves of the first V groove group; disposing the second support member above the first support member in such a manner that each V groove of the second V groove group corresponds to, and is in contact with, the optical fiber wires disposed in one of the V grooves of the first V groove group; disposing each of a plurality of optical fiber wires in one of the V grooves of the third V groove group; and disposing the fourth support member above the third support member in such a manner that each V groove of the fourth V groove group corresponds to, and is in contact with, the optical fiber wire disposed in one of the V grooves of the third V groove group.

In accordance with still another aspect of the present invention, an optical coupling module including an optical fiber array ferrule is provided. The optical fiber array ferrule includes: a plurality of mutually parallel guiding holes; and a plurality of optical fiber wires each being disposed in one of the guiding holes, forming a two-dimensional optical fiber array.

In accordance with still another aspect of the present invention, a method for producing an optical coupling module is provided. The method includes the steps of: forming an optical fiber array ferrule having optical fiber wires disposed in each of a plurality of mutually parallel guiding holes; preparing a surface emitting laser array having a plurality of surface emitting lasers formed on a substrate in a two-dimensional array configuration; emitting light from two of the surface emitting lasers of the surface emitting laser array, the two surface emitting lasers being diagonally positioned; guiding the output laser light from the two surface emitting lasers to two of the optical fiber wires of the optical fiber array ferrule, the two optical fiber wires being at positions corresponding to the two surface emitting lasers; aligning positions of the surface emitting laser array and the optical fiber array ferrule in such a manner that the output light of the two surface emitting lasers guided to the two optical fiber wires is maximized; and putting for one piece the surface emitting laser array and the optical fiber array ferrule which are aligned.

In accordance with still another aspect of the present invention, a method for producing an optical coupling module is provided. The method includes the steps of: preparing a surface emitting laser array having a plurality of surface emitting lasers formed on a substrate in a two-dimensional array configuration; forming a plurality of guiding holes on a rear surface of the substrate of the surface emitting laser array, each of the guiding holes being at positions corresponding to one of the surface emitting lasers; forming a plurality of mutually parallel guiding holes in a bulk material constituting an optical fiber array ferrule; inserting two guiding rods respectively to two of the guiding holes of the optical fiber array ferrule, the two guiding holes being diagonally positioned; further inserting the two guide rods respectively to two corresponding guiding holes of the surface emitting laser array, and aligning the surface emitting laser array and the optical fiber array ferrule; putting together for one piece the surface emitting laser array and the optical fiber array ferrule which are aligned; removing the guiding rods; and inserting optical fiber wires to all of the plurality of guiding holes of the optical fiber array ferrule.

In accordance with still another aspect of the present invention, a method for producing an optical coupling module is provided. The method includes the steps of: preparing a surface emitting laser array having a plurality of surface emitting lasers formed on a substrate in a two-dimensional array configuration; forming a plurality of mutually parallel guiding holes in a bulk material constituting an optical fiber array ferrule; forming first connecting pads by patterning at least at two locations on a rear surface of the substrate of the surface emitting laser array and second connecting pads at least at two locations on a surface of the optical fiber array ferrule opposed to the surface emitting laser array in such a manner that the first and second connecting pads oppose to each other and each of the guiding holes of the optical fiber array ferrule and corresponding one of the surface emitting lasers of the surface emitting laser array oppose to each other; and connecting the first connecting pads and the second connecting pads in a self-aligning manner.

The optical fiber array ferrule in the present invention is an optical device for optically coupling a laser array and a plurality of optical fibers, where the plurality of optical fibers are arranged and fixed in array configuration. In the following description, the plurality of optical fibers (or the optical fiber array) to be fixed by the optical fiber array ferrule may be described as one of the constituent elements of the optical fiber array ferrule.

In the optical coupling module having the above-described structure, the two-dimensional fiber array ferrule is realized by stacking a plurality of support members. When this is being done, a plurality of V grooves are formed on the upper and lower surfaces of the support member, and optical fiber wires are disposed there. The optical fiber wires are further interposed between the support members. As a result, the support members are aligned to one another and the misalignment in the horizontal direction does not occur, thereby easily and accurately realizing a highly efficient optical coupling between the surface emitting laser array and the optical fiber array.

Moreover, fibers of the two-dimensional optical fiber array optically coupled to the surface emitting laser array mounted on and parallel with the substrate, can be arranged in parallel with the substrate by using a prism having a 45-degree-mirror function and a lens function.

Furthermore, the number of parts and the number of production steps necessary to obtain the two-dimensional optical fiber array can be reduced by using the optical fiber array ferrule having a plurality of guiding holes formed in two-dimensional configuration. Moreover, optical coupling between the optical fiber and the surface emitting laser can be easily realized with high coupling efficiency by integrally forming the two-dimensional surface emitting laser array and the above-mentioned optical fiber array ferrule as one piece. As a result, a highly efficient optical coupling module is realized at a considerably low cost.

Thus, the invention described herein makes possible the advantages of (1) providing an optical coupling module which can easily and accurately realize optical coupling having high coupling efficiency between the two-dimensional surface emitting laser array and the optical fiber array, and of (2) providing a method of producing the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the attached figures.

Embodiment 1

Figure 1:
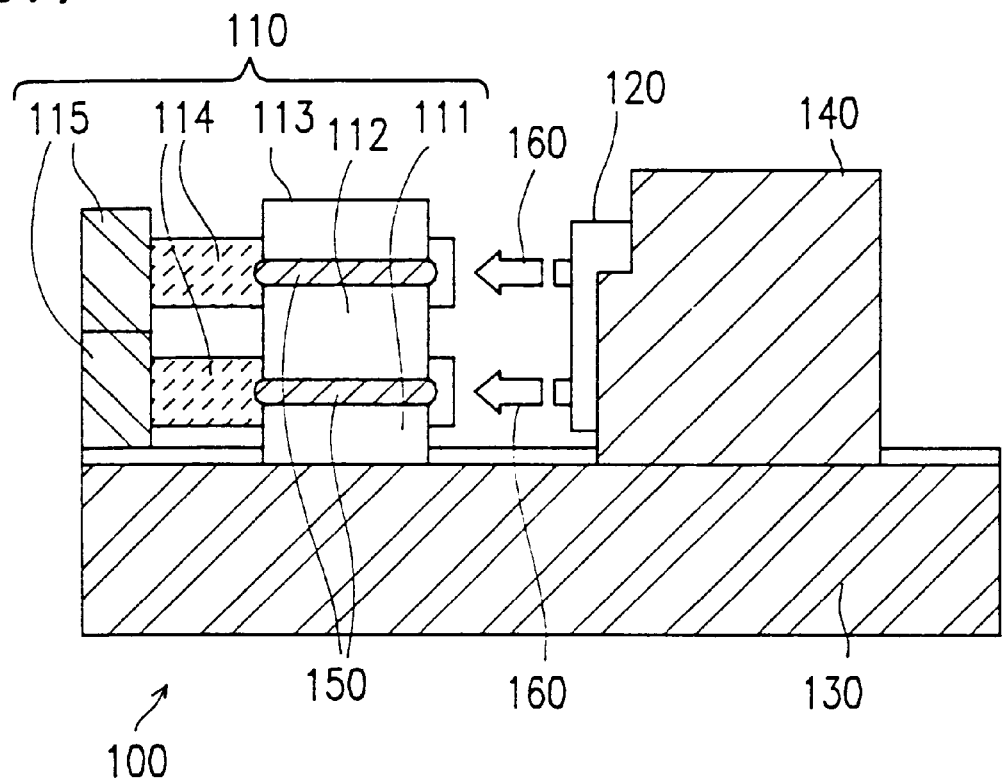
FIG. 1 is a side view schematically illustrating the structure of an optical coupling module according to a first embodiment of the present invention.

FIG. 1 is a side view schematically illustrating the structure of an optical coupling module 100 according to a first embodiment of the present invention.

The optical coupling module 100 includes an optical fiber array ferrule 110 mounted on a substrate 130. The optical coupling module 100 further includes a surface emitting laser array 120 which is mounted onto a heat sink 140. The heat sink 140 is mounted onto the substrate 130 in such a manner that the surface emitting laser array 120 faces toward the optical fiber array ferrule 110. In other words, the surface emitting laser array 120 is vertically mounted with respect to the substrate 130 using the heat sink 140.

The optical fiber array ferrule 110 includes a first support member 111, a second support member 112, a third support member 113, optical fiber wires 114 interposed between the first support member 111 and the second support member 112 and between the second support member 112 and the third support member 113, and jackets 115 protecting the optical fiber wires 114. An optical fiber includes the optical fiber wire 114 and the jacket 115. The space between the first support member 111 and the second support member 112 and the space between the second support member 112 and the third support member 113 are filled and secured with an adhesive agent 150. As the adhesive agent, materials such as epoxy type resin, photocurable resin or the like can be used. Laser light 160 emitted from the surface emitting laser array 120 is optically coupled to the optical fiber wires 114 of the optical fiber array ferrule 110.

Figure 2:
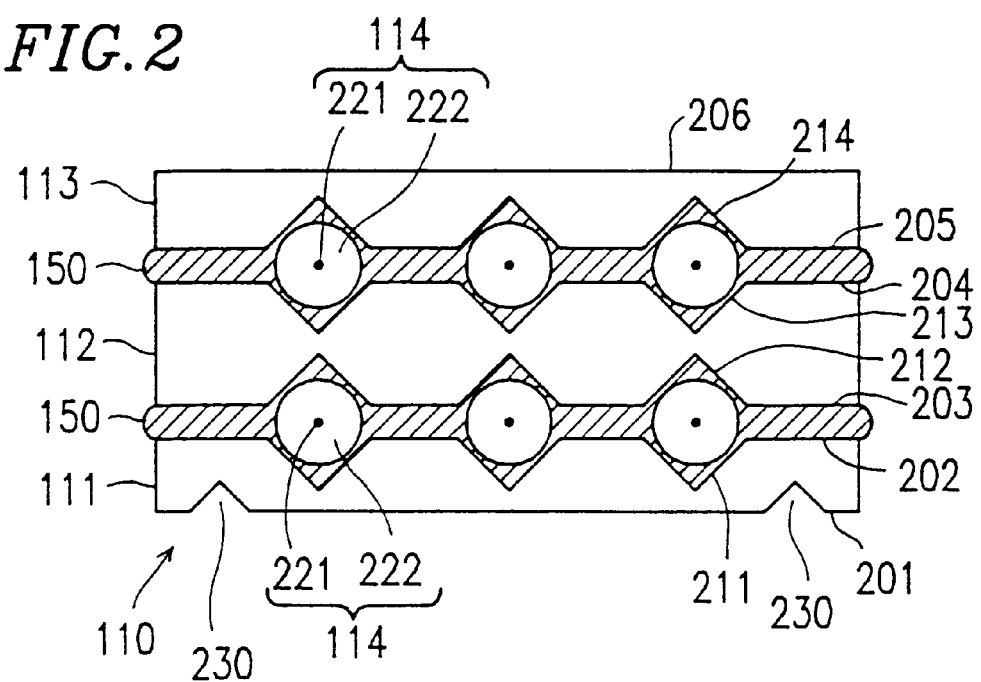
FIG. 2 is a cross-sectional view schematically illustrating the structure of the optical fiber array ferrule included in the optical coupling module illustrated in FIG. 1.

Next, the optical fiber array ferrule 110 will be described in detail with reference to FIG. 2. FIG. 2 is a cross-sectional view of the optical fiber array ferrule 110. In the figure, the same reference numerals used in FIG. 1 are used to designate similar elements, and the descriptions thereof are omitted.

The first support member 111 has a first lower surface 201 and a first upper surface 202 which are parallel to each other. The first upper surface 202 is provided with a first group 211 of V grooves including a plurality of V grooves formed parallel to each other with a spacing of about 250 μm, each V groove having a width of about 133 μm, a depth of about 66.5 μm and a bottom angle of approximately 90 degrees. A distance between the first lower surface 201 and the first upper surface 202 (i.e., the thickness of the first support member 111) is about 150 μm. The first lower surface 201 is provided with two V grooves 230 which are formed parallel to each other and function as a guide when mounting the optical fiber array ferrule 110 on the substrate 130 (FIG. 1). Furthermore, the optical fiber wire 114 of the optical fiber is disposed in each of the V grooves of the first V groove group 211. The optical fiber wire 114 includes a core 221 and a cladding 222 surrounding the core 221. The diameter of the optical fiber wire 114 is about 125 μm, and the diameter of the core 221 is about 50 μm.

The second support member 112 has a second lower surface 203 and a second upper surface 204 which are parallel to each other. The second lower surface 203 is provided with a second group 212 of V grooves including a plurality of V grooves formed parallel to each other with a spacing of about 250 µm, each V groove having a width of about 133 µm, a depth of about 66.5 µm and a bottom angle of approximately 90 degrees. The second upper surface 204 is provided with a third group 213 of V grooves including a plurality of V grooves formed parallel to each other with a spacing of about 250 µm, each V groove having a width of about 133 µm, a depth of about 66.5 µm and a bottom angle of approximately 90 degrees. The V grooves in the second group 212 and the V grooves in the third group 213 are provided at locations opposed to one another. A distance between the second lower surface 203 and the second upper surface 204 (i.e., the thickness of the second support member 112) is about 206 µm. Furthermore, the optical fiber wire 114 is disposed in each of the V grooves of the third group 213. The optical fiber wire 114 includes a core 221 and a cladding 222 surrounding the core 221. The diameter of the optical fiber wire 114 is about 125 ||m, and the diameter of the core 221 is about 50 µm. As a result, a distance between the optical fiber wires 114 disposed on and directly under the second support member 112 is about 250 µm.

The third support member 113 has a third lower surface 205 and a third upper surface 206 which are parallel to each other. The third lower surface 205 is provided with a fourth group 214 of V grooves including a plurality of V grooves formed parallel to each other with a spacing of about 250 µm, each V groove having a width of about 133 µm, a depth of about 66.5 µm and a bottom angle of approximately 90 degrees. A distance between the third lower surface 205 and the third upper surface 206 (i.e., the thickness of the third support member 113) is about 150 µm.

The first, second and third support members 111, 112 and 113 are stacked one on top of another, with the V groove groups being aligned, and fastened together with the adhesive agent 150. Specifically, the first support member 111 and the second support member 112 are put together in such a manner that the optical fiber wires 114 disposed in the V grooves of the first group 211 also make contact with the V grooves of the second group 212. Furthermore, the second support member 112 and the third support member 113 are put together in such a manner that the optical fiber wires 114 disposed in the V grooves of the third group 213 also make contact with the V grooves of the fourth group 214.

The first, second and third support members 111, 112 and 113 can be produced by a method known in the art. Specifically, a desired shape can be produced on the order of submicrons by machining metal materials such as aluminum and titanium or ceramic materials such as zirconia and alumina. The desired shape can also be produced by performing metal press on a glass substrate. Furthermore, the V groove can be formed with surfaces having a specific crystalline orientation by performing anisotropic etching on a semiconductor substrate such as a silicon substrate. For example, a (111) surface can easily be formed on a (001) surface with excellent accuracy by anisotropic etching on the silicon substrate.

Next, processes for producing the optical fiber array ferrule 110 will be described with reference to the cross-sectional views illustrated in FIGS. 8A to 8D.

Figure 8A:
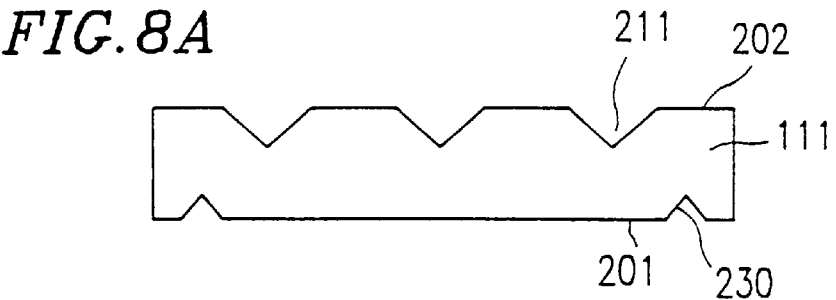
FIGS. 8A to 8D are cross-sectional views for describing the production processes for the optical fiber array ferrule illustrated in FIG. 2.

In process (1), as illustrated in FIG. 8A, the first group 211 of V grooves, and the V grooves 230 for guiding attachment to the substrate 130, are formed on the first upper surface 202 and the first lower surface 201, respectively, of the first support member 111.

Figure 8B:
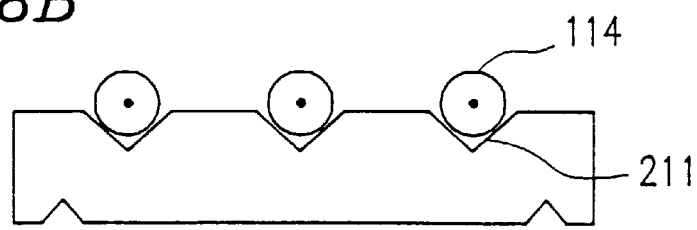

In process (2), as illustrated in FIG. 8B, the optical fiber wires 114 are disposed in each of the grooves in the first group 211.

Figure 8C:
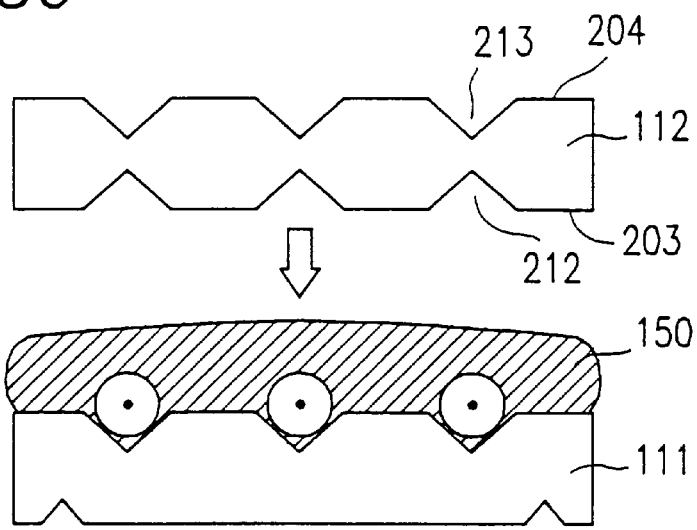

In process (3), as illustrated in FIG. 8C, the adhesive agent 150 is applied onto the first upper surface 202 of the first support member 111 so as to cover the optical fiber wires 114 disposed thereon. Then, the second support member 112 which has the second lower surface 203 and the second upper surface 204 having the second group 212 of V grooves and the third group 213 of V grooves, respectively, is disposed on the applied adhesive agent 150.

Figure 8D:
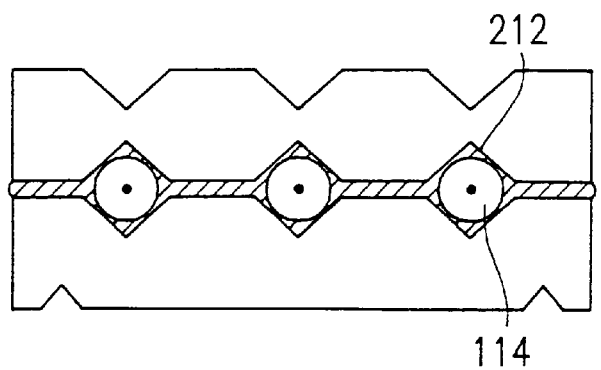

In process (4), as illustrated in FIG. 8D, the second support member 112 is pressed against the first support member 111 in such a manner that the V grooves in the second group 212 provided to the second support member 112 make contact with the optical fiber wires 114 disposed in the grooves of the first group 211 provided to the first support member 111. Then, the first and second support members 111 and 112 which have the optical fiber wires 114 therebetween are fixed and secured.

The optical fiber array ferrule 110 having multi-layer structure can be produced by repeating the processes (1)–(4) described above.

In the production processes for the optical fiber array ferrule 110 as described above, the groups of V grooves provided on the lower surfaces of the support members (for example, the second and fourth groups of V grooves 212 and 214, respectively) have a guiding function for positional alignment with respect to the opposing optical fiber wires (i.e., the group of V grooves) when the plurality of support members are being stacked. This makes it possible to easily and accurately arrange the optical fiber wires 114 in the two-dimensional array configuration similar to the surface emitting laser array 120 (FIG. 1) functioning as a light source.

Figure 3:
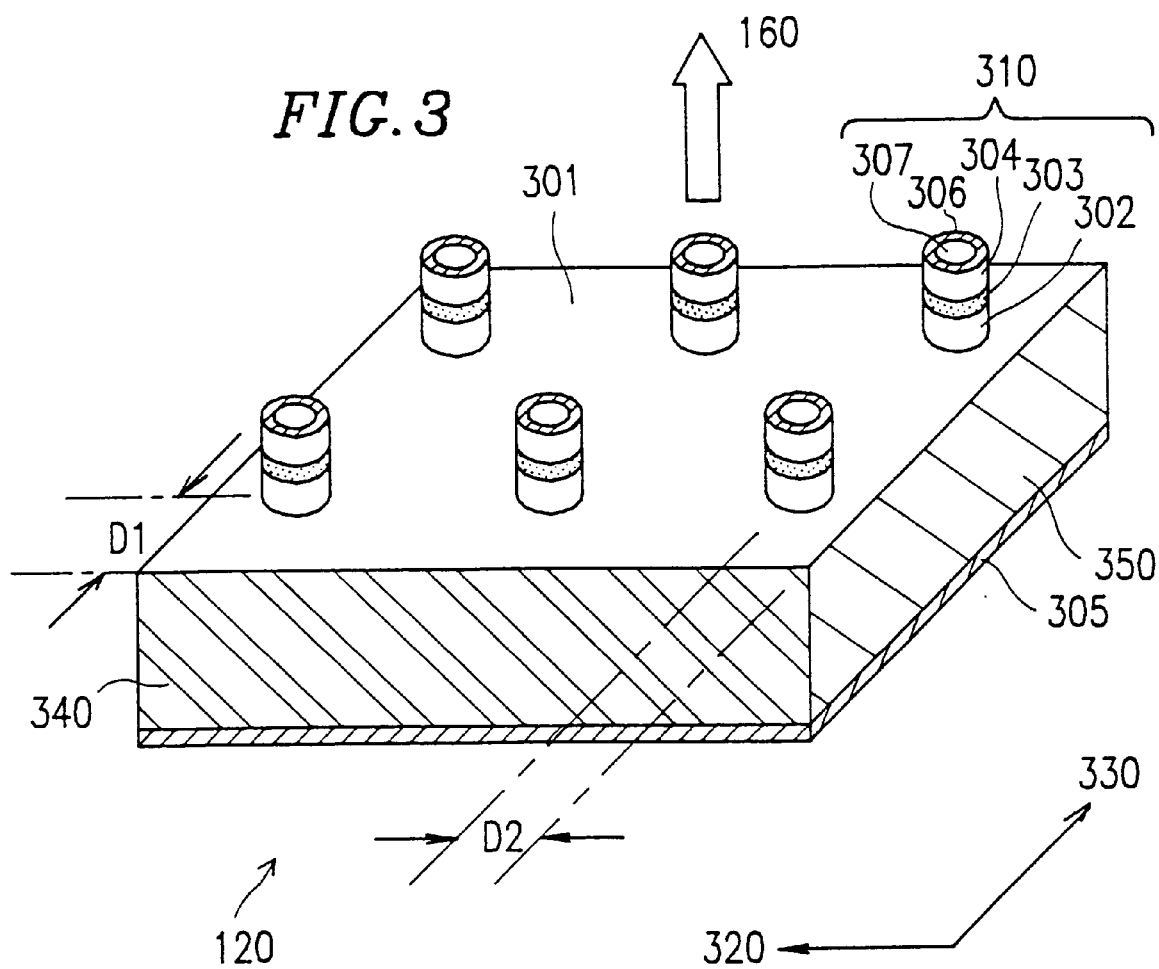
FIG. 3 is a perspective view schematically illustrating the structure of the surface emitting laser array included in the optical coupling module illustrated in FIG. 1.

Next, the surface emitting laser array 120 will be described with reference to FIG. 3. FIG. 3 is a perspective view schematically illustrating the surface emitting laser array 120. The same reference numerals used in FIG. 1 are used in FIG. 3 to designate similar elements.

The surface emitting laser array 120 has six surface emitting laser mesas 310. Each surface emitting laser mesa 310 has a layered structure for laser oscillation including a lower semiconductor mirror 302, an active region 303 and an upper semiconductor mirror 304. The lower semiconductor mirror 302 is formed on the semiconductor substrate 301, and the active region 303 is formed so as to be interposed between the lower semiconductor mirror 302 and the upper semiconductor mirror 304.

The semiconductor substrate 301 is made of n type GaAs. The lower semiconductor mirror 302 has a layered structure where 24.5 pairs of n type GaAs layers and n type AlAs layers are laminated, forming a distributed Bragg reflector. Similarly, the upper semiconductor mirror 304 has a layered structure where 24.5 pairs of p type GaAs layers and p type AlAs layers are laminated, forming a distributed Bragg reflector. The active region 303 has a structure where a strained quantum well layer including InGaAs layers as the well layer and GaAs layers as the barrier layer is interposed between AlGaAs cladding layers. The active region is designed for oscillation of light having a wavelength of about 0.98 µm. In the present embodiment, the surface emitting laser mesas 310 are arranged in an array configuration of three columns in the first direction 320 and two rows in the second direction 330 as illustrated in FIG. 3.

The surface emitting laser mesa 310 further includes a p type electrode 306, which has an opening 307, formed on the upper semiconductor mirror 304. An n type electrode 305 is, on the other hand, formed on the bottom surface of the semiconductor substrate 301. The laser light as the output light from the surface emitting laser mesa 310 is emitted from the opening 307.

The surface emitting laser array 120 can be produced in a method known in the art. Specifically, first, semiconductor layers 302, 303 and 304 are epitaxially grown on a semiconductor substrate 301 by MBE (Molecular Beam Epitaxy), MOCVD (Metal Organic Chemical Vapor Deposition) or the like. Then, a plurality of mesas 310 having a diameter of about 20 μm and reaching down to the lower semiconductor mirror 302 are formed by etching. During the etching, six mesas 310 are formed in array configuration of three columns in the first direction 320 with a spacing of about 250 μm and two rows in the second direction 330 with a spacing of about 250 μm. Finally, the n type electrode 305 as well as the p type electrode 306 having an opening 307 of a diameter of about 10 μm are formed, thereby completing the structure of each surface emitting laser 120.

Finally, the wafer including the above-described structures is cleaved to obtain each surface emitting laser array 120. In doing so, the wafer is cleaved such that a distance D1 from the first cleaved surface 340 to the center of the mesa belonging to the row closest to this cleaved surface is about 100 μm and a distance D2 from the second cleaved surface 350 to the center of the mesa belonging to the column closest to this cleaved surface is about 50 μm. This cleavage can be easily realized on the order of submicrons with guiding grooves (not shown in the figure) formed on the semiconductor substrate 301 by photolithography and etching.

Figure 4:
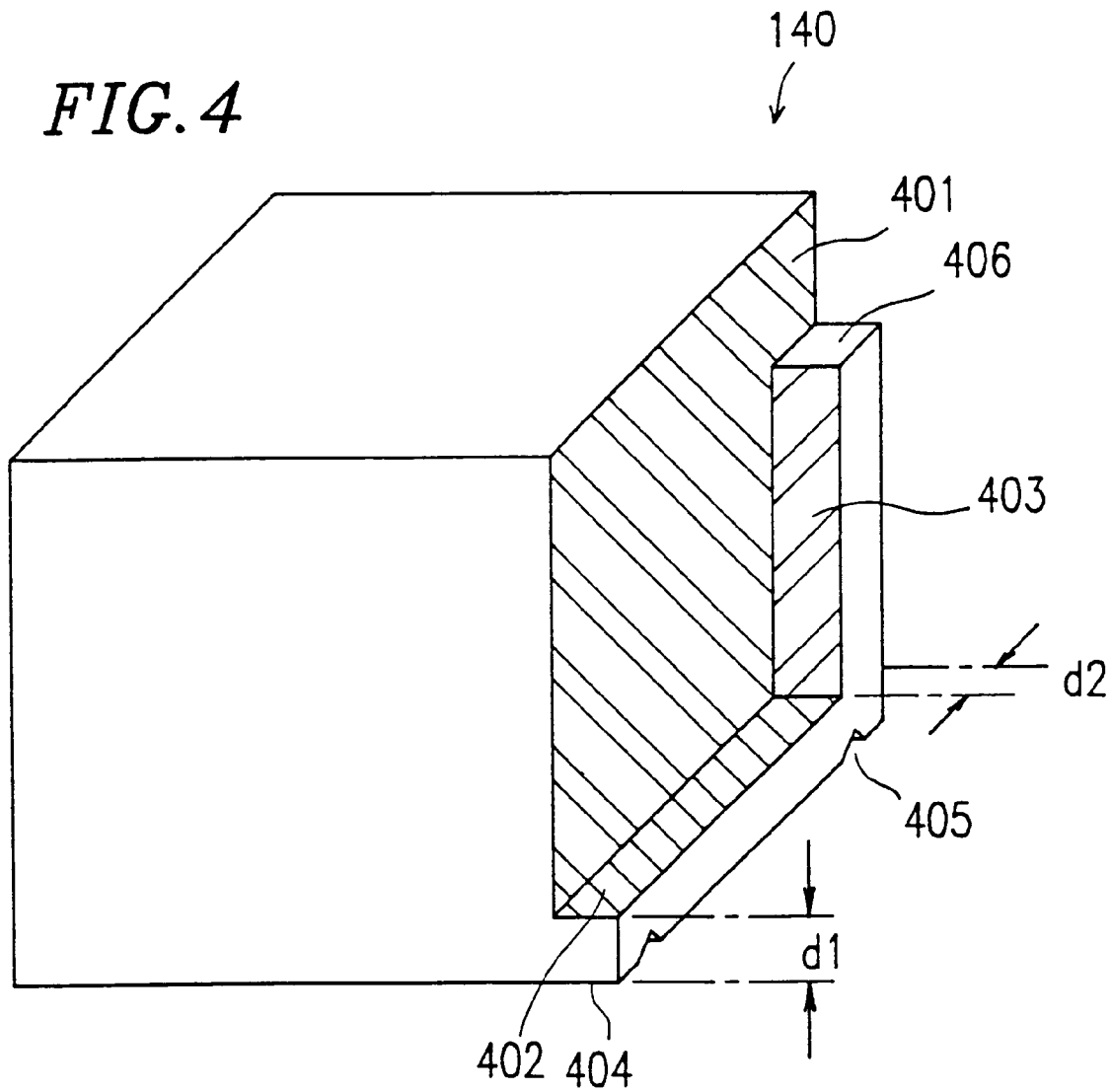
FIG. 4 is a perspective view schematically illustrating the structure of the heat sink included in the optical coupling module illustrated in FIG. 1.

Next, the heat sink 140 will be described with reference to FIG. 4, which is a perspective view schematically illustrating the heat sink 140.

The side surface 401 of the heat sink 140 is provided with an L-shape guide 406 for accommodating the surface emitting laser array 120 (FIG. 3). The L-shape guide 406 has a first guiding surface 402 and a second guiding surface 403. A distance d1 from the first guiding surface 402 to the bottom surface 404 of the heat sink 140 is about 72 μm. The width of the portion of the L-shape guide 406 having the second guiding surface 403 is about 50 μm. The bottom surface 404 of the heat sink 140 is provided with two guiding grooves 405 which are parallel to each other and to be used for positional alignment when the heat sink 140 is mounted on the substrate.

The heat sink 140 can be produced by a method known in the art. Materials having high thermal conductivity such as Cu and diamond are used for the heat sink 140. The surface of the heat sink 140 is coated with Au.

Figure 7:
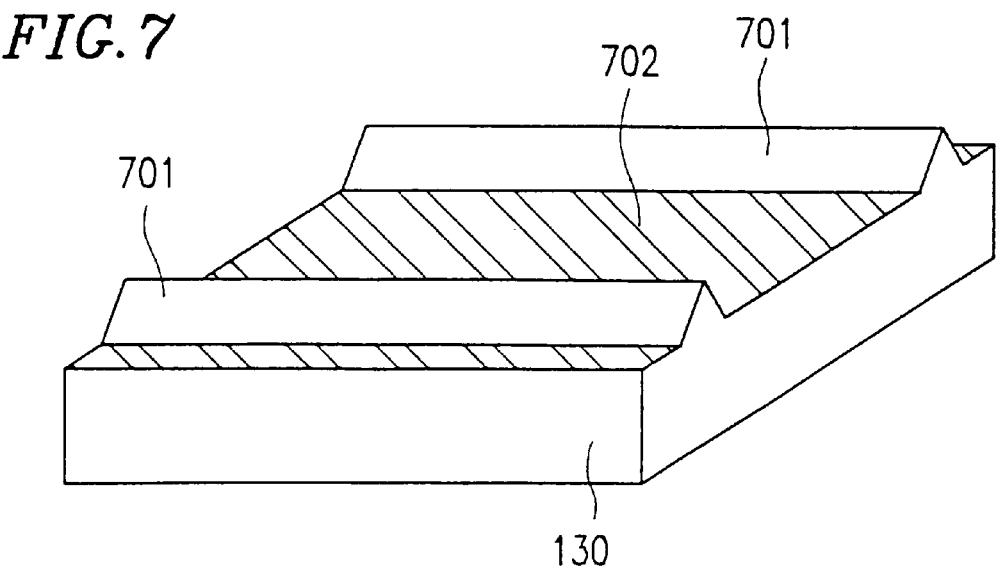
FIG. 7 is a perspective view schematically illustrating the structure of the substrate included in the optical coupling module illustrating in FIG. 1.

Next, the substrate 130 will be described with reference to FIG. 7, FIG. 7 is a perspective view schematically illustrating the substrate 130.

Two V-shape ridges or rails 701 are formed parallel to each other on the upper surface 702 of the substrate 130. These ridges 701 are formed such that they correspond to the V grooves 230 (V-shape guiding grooves) provided on the first lower surface 201 of the first support member 111 included in the optical fiber array ferrule 110 and the V-shape guiding grooves 405 provided on the bottom surface 404 of the heat sink 140. These ridges 701 are used so that the ridges 701 and the V-shape guiding grooves 230 and 405 are aligned when the optical fiber array ferrule 110 and the heat sink 140 are being mounted on the substrate 130.

Next, a method for producing the optical coupling module 100 will be described.

In process (1), the surface emitting laser array 120 is fixed to the heat sink 140 such that the side surface 401 of the heat sink 140 and the n type electrode 305 of the surface emitting laser array 120 are in contact. When this is being done, the heat sink 140 and the surface emitting laser array 120 are aligned such that the first cleaved surface 340 of the surface emitting laser array 120 is in contact with the first guiding surface 402 of the heat sink 140 and the second cleaved surface 350 of the surface emitting laser array 120 is in contact with the second guiding surface 403 of the heat sink 140.

In process (2), the bottom surface 404 of the heat sink 140, onto which the surface emitting laser array 120 is fixed, is then fixed onto the substrate 130. When this is being done, the heat sink 140 and the substrate 130 are aligned such that the guiding grooves 405 formed on the bottom surface 404 correspond to the V-shape ridges 701 provided on the substrate 130.

In process (3), the optical fiber array ferrule 110 produced in the above-described method is installed on the substrate 130. When this is being done, the optical fiber array ferrule 110 and the substrate 230 are aligned such that the V grooves 230 (V-shape guiding grooves) provided on the first lower surface 201 of the first support member 111 of the optical fiber array ferrule 110 correspond to the V-shape ridges 701 on the substrate 130. This completes the optical coupling module 100 illustrated in FIG. 1.

Figure 9:
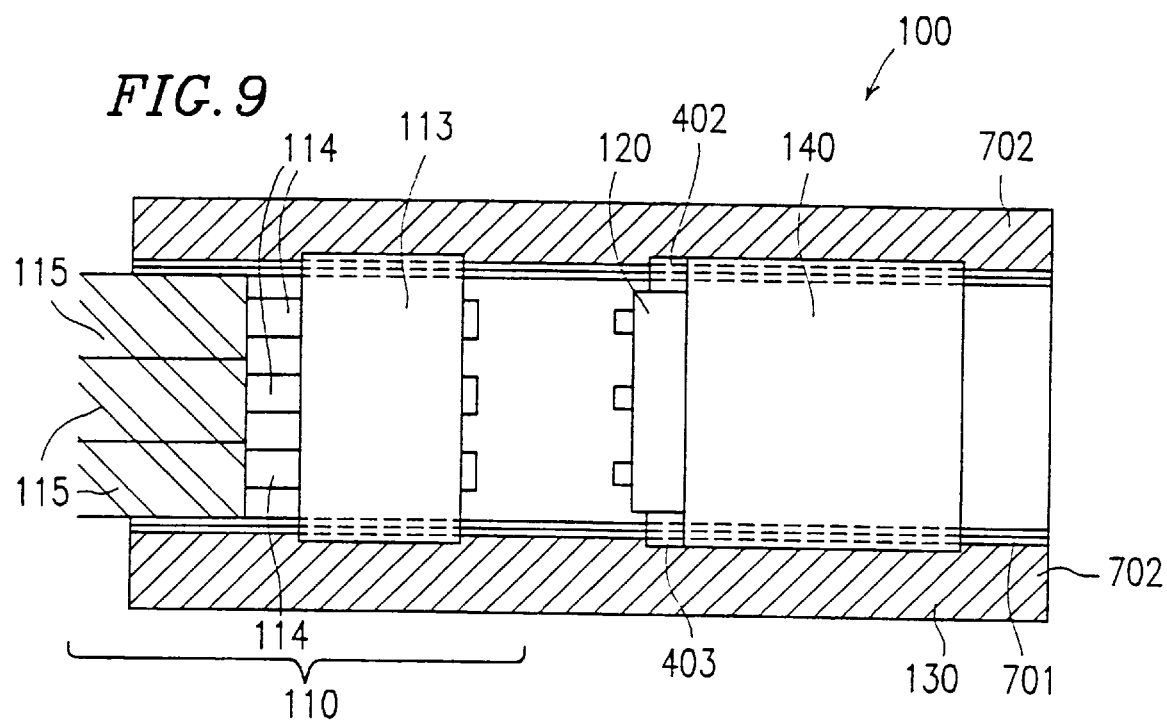
FIG. 9 is a top view schematically illustrating the structure of the optical coupling module illustrated in FIG. 1.

FIG. 9 is a top view of the optical coupling module 100 produced in the above-described processes (1), (2) and (3). In FIG. 9, the same constituent elements described previously are designated by the same reference numerals.

As illustrated in FIG. 9, the use of the V-shape ridges 701 provided on the substrate 130 in addition to use of the L-shape guide and the V-shape guiding grooves both provided to the heat sink 140 makes it no longer necessary to align the optical axis in the direction perpendicular to the ridges 701 and in the direction normal to the upper surface 702 of the substrate 130. Consequently, the surface emitting laser array 120 can easily and accurately be incorporated into and fixed to the optical coupling module 100. As a result, the optical coupling module 100 is realized which requires no alignment.

As described above, in the optical coupling module 100 in the present embodiment, the V grooves are formed on both the upper surfaces and the lower surfaces of the plurality of support members included in the optical fiber array ferrule 110, and the optical fiber wires are disposed in those V grooves. The optical fiber wires disposed as such are further interposed between the support members from above and below. Consequently, the two-dimensional optical fiber array is constituted by stacking one dimensional optical fiber array for a plurality of layers in the optical fiber array ferrule 110. By forming the V grooves on each surface such that the V grooves on the opposing surfaces of the support members positioned above and below of each other correspond to one another when stacking the support members, positions of the optical fiber wires can easily and accurately be aligned in the vertical direction without the support members becoming misaligned in the horizontal direction. As a result, the two-dimensional optical fiber array which is in perfect correspondence with the array configuration of the surface emitting laser array 120 functioning as a light source is realized in the optical fiber array ferrule 110.

Moreover, in the optical coupling module 100, the optical fiber array ferrule 110 is fixed to the substrate 130 such that the optical fibers included in the ferrule are parallel with the substrate 130 while the surface emitting laser array 120 is fixed vertically on the substrate 130. The laser light 160 emitted from the surface emitting laser array 120 is coupled to the optical fibers in the optical fiber array ferrule 110 and can be taken out as an optical output in the direction parallel with the substrate 130. As a result, when an optical coupling system is configured, for example, as a board for optical wiring for making connection among computers, it becomes possible to take out the optical fibers in the direction parallel with the board by simply mounting the optical coupling module 100 on the board. This makes the board thinner, and more compact configuration of the optical coupling system becomes possible.

Embodiment 2

Figure 5:
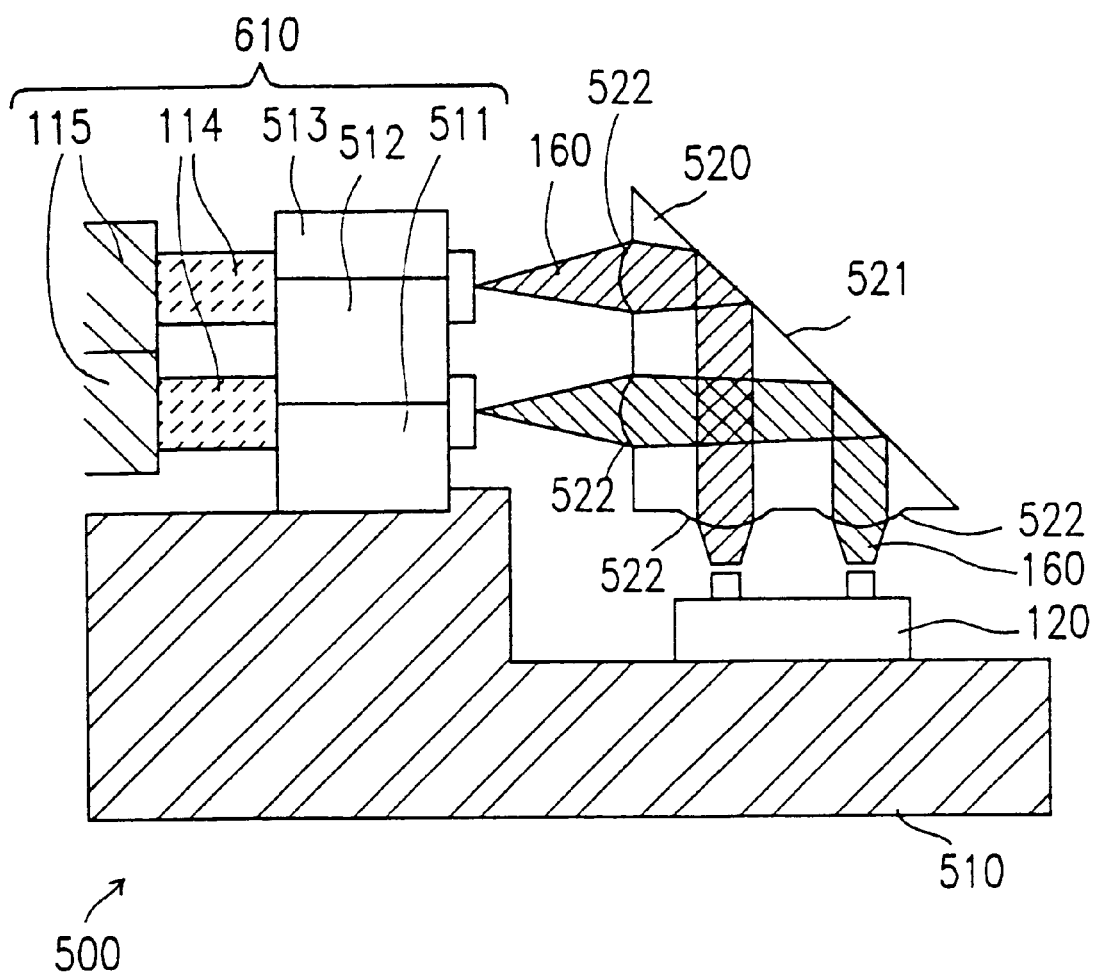
FIG. 5 is a side view schematically illustrating the structure of an optical coupling module according to a second embodiment of the present invention.

FIG. 5 is a side view schematically illustrating the structure of an optical coupling module 500 according to a second embodiment of the present invention. Those constituent elements of the optical coupling module 500 which are the same as those of the optical coupling module 100 in the first embodiment are designated by the same reference numerals, and the descriptions therefor are omitted.

The optical coupling module 500 includes an optical fiber array ferrule 610 mounted on the substrate 510, a surface emitting laser array 120 mounted on and parallel with the substrate 510, and a prism 520 guiding the laser light 160 emitted from the surface emitting laser array 120 to a two-dimensional optical fiber array of the optical fiber array ferrule 610.

The optical fiber array ferrule 610 includes a first support member 511, a second support member 512, a third support member 513, optical fiber wires 114 interposed between the first support member 511 and the second support member 512 and between the second support member 512 and the third support member 513, and jackets 115 protecting the optical fiber wires 114. An optical fiber includes the optical fiber wire 114 and the jacket 115. The laser light 160 emitted from the surface emitting laser array 120 is guided through the prism 520 to the two-dimensional optical fiber array of the optical fiber array ferrule 610 and is optically coupled to the optical fiber wires 114.

Figure 6:
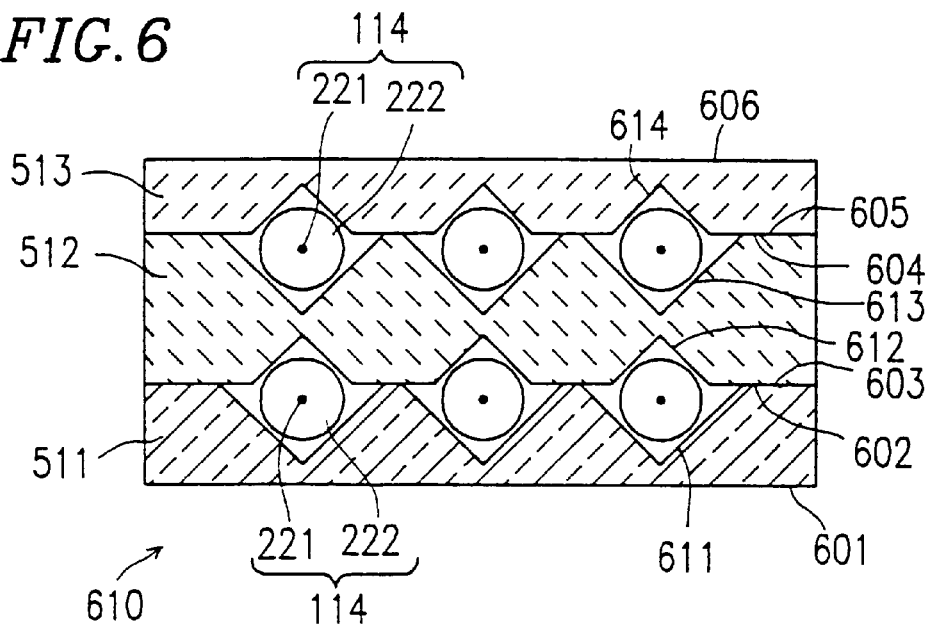
FIG. 6 is a cross-sectional view schematically illustrating the structure of the optical fiber array ferrule included in the optical coupling module illustrated in FIG. 5.

Next, the optical fiber array ferrule 610 will be described in detail with reference to FIG. 6. FIG. 6 is a cross-sectional view of the optical fiber array ferrule 610. Constituent elements which are the same as those previously described are designated by the same reference numerals, and the descriptions therefor are omitted.

The first support member 511 has a first lower surface 601 and a first upper surface 602 which are parallel to each other. The first upper surface 602 is provided with a first group 611 of V grooves including a plurality of V grooves formed parallel to each other with a spacing of about 250 μm, each V groove having a width of about 240 μm, a depth of about 120 μm and a bottom angle of approximately 90 degrees. A distance between the first lower surface 601 and the first upper surface 602 (i.e., the thickness of the first support member 511) is about 200 μm. Furthermore, the optical fiber wires 114, each of which includes a core 221 and a cladding 222 surrounding the core 221, are disposed in each of the V grooves of the first group 611.

The second support member 512 has a second lower surface 603 and a second upper surface 604 which are parallel to each other. The second lower surface 603 is provided with a second group 612 of V grooves including a plurality of V grooves formed parallel to each other with a spacing of about 250 μm, each V groove having a width of about 120 μm, a depth of about 60 μm and a bottom angle of approximately 90 degrees. The second upper surface 604 is provided with a third group 613 of V grooves including a plurality of V grooves formed parallel to each other with a spacing of about 250 μm, each V groove having a width of about 240 μm, a depth of about 120 μm and a bottom angle of approximately 90 degrees. The grooves in the second group 612 and the grooves in the third group 613 are provided at locations opposing to one another. A distance between the second lower surface 603 and the second upper surface 604 (i.e., the thickness of the second support member 512) is about 250 μm. Furthermore, the optical fiber wires 114 of the optical fiber, each of which includes a core 221 and a cladding 222 surrounding the core 221, are disposed in each of the V grooves of the third group 613. As a result, a distance between the optical fiber wires 114 disposed on and directly under the second support member 512 is about 250 μm.

The third support member 513 has a third lower surface 605 and a third upper surface 606 which are parallel to each other. The third lower surface 605 is provided with a fourth group 614 of V grooves including a plurality of V grooves formed parallel to each other with a spacing of about 250 μm, each V groove having a width of about 120 μm, a depth of about 60 μm and a bottom angle of approximately 90 degrees. A distance between the third lower surface 605 and the third upper surface 606 (i.e., the thickness of the third support member 513) is about 150 μm.

The first, second and third support members 511, 512 and 513 are bonded together such that the first and second support members 511 and 512 are in contact with each other and that the second and third support members 512 and 513 are in contact with each other. This bonding can be realized by depositing metal such as Au on the portions of the first upper surface 602, the second lower surface 603, the second upper surface 604 and the third lower surface 605, where the V grooves are not formed, and then by fusing the deposited metals together.

In the optical fiber array ferrule 610 configured as described above, the shape of the V grooves differs for those formed on the upper surface and those formed on the lower surface of each support member. By making the V grooves formed on the upper surface larger and deeper than the V grooves formed on the lower surface, the optical fiber wires can be securely disposed in the V grooves.

Next, the prism 520 will be described with reference to FIG. 5.

The prism 520 includes a 45-degree-mirror 521 and lenses 522. Specifically, the 45-degree-mirror 521 is a surface deposited with metal such as aluminum, which reflects the laser light 160 emitted from the surface emitting laser array 120 in a direction normal to the substrate 510 so as to couple the laser light 160 onto the optical fiber wires 114 of the optical fiber array ferrule 610 disposed parallel with the substrate 510. The lenses 522 are provided for coupling the laser light 160 which has a certain degree of spreading angle onto the core of the optical fiber wire 114 efficiently. The prism 520 including the lenses 522 can be produced in a method known in the art, for example, by integrally molding with a metal mold.

Next, a method for producing the optical coupling module 500 will be described.

In process (1), the surface emitting laser array 120 is fixed on the substrate 510 horizontally with respect to the substrate 510. Next, the optical fiber array ferrule 610 is fixed on the substrate 510 so that the optical fiber wires 114 becomes horizontal with respect to the substrate 510.

In process (2), the surface emitting laser array 120 is lased and the laser light 160 is coupled to the optical fiber wires 114. Then, the position of the prism 520 is adjusted so that the intensity of the laser light 160 output through the two optical fiber wires 114 diagonally positioned is maximized.

In the optical coupling module 500 in the present embodiment configured as described above, the shape of the V grooves differs for those formed on the upper surface and those formed on the lower surface of each support member included in the optical fiber array ferrule 610. By making the V grooves formed on the upper surface larger and deeper than the V grooves formed on the lower surface, the optical fiber wires can be securely and stably disposed in the V grooves.

Furthermore, by using the prism 520 having both the 45-degree-mirror function and the lens function, the laser light 160 output normal to the substrate 510 from the surface emitting laser array 120 fixed parallel to the substrate 510 can be efficiently coupled to the two-dimensional optical fiber array included in the optical fiber array ferrule 610 and disposed parallel with the substrate 510.

Moreover, the laser light 160 is oscillated from the surface emitting laser array 120, and the position of the prism 520 is adjusted so that the intensity of the laser light 160 to be coupled to the two optical fiber diagonally positioned is maximized. This automatically optimizes the coupling of the laser light 160 to other optical fibers. Therefore, highly efficient optical coupling between the surface emitting laser array 120 and the optical fiber array included in the optical fiber array ferrule 610 can easily be realized.

Embodiment 3

Figure 10:
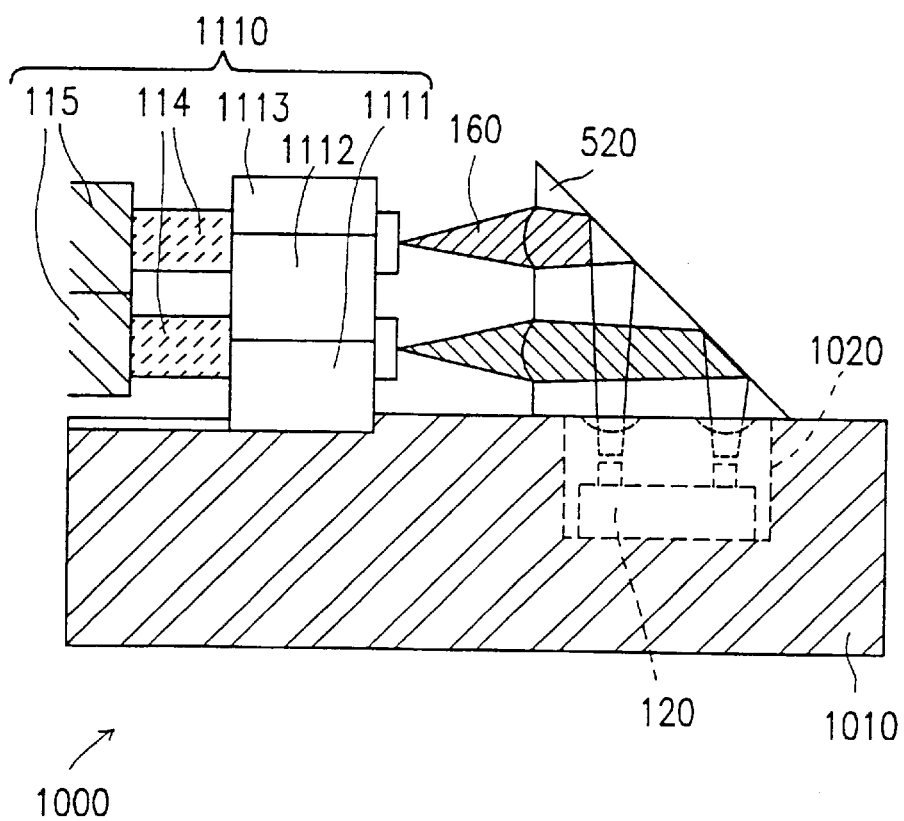
FIG. 10 is a side view schematically illustrating the structure of an optical coupling module according to a third embodiment of the present invention.

FIG. 10 is a side view schematically illustrating the structure of an optical coupling module 1000 according to a third embodiment of the present invention. The same constituent elements described previously are designated by the same reference numerals, and the descriptions therefor are omitted.

The optical coupling module 1000 includes an optical fiber array ferrule 1110 mounted on a substrate 1010, the surface emitting laser array 120 mounted on and parallel with the substrate 1010, and the prism 520 guiding the laser light 160 output from the surface emitting laser array 120 to the two-dimensional optical fiber array of the optical fiber array ferrule 1110. The substrate 1010 is provided with a hole 1020, in which the surface emitting laser 120 is installed. The prism 520 is fixed on the substrate 1010 so as to cover the hole 1020.

The optical fiber array ferrule 1110 includes a first support member 1111, a second support member 1112, a third support member 1113, optical fiber wires 114 interposed between the first support member 1111 and the second support member 1112 and between the second support member 1112 and the third support member 1113, and jackets 115 protecting the optical fiber wires 114. An optical fiber includes the optical fiber wire 114 and the jacket 115. Laser light 160 emitted from the surface emitting laser array 120 is guided through the prism 520 to the two-dimensional optical fiber array in the optical fiber array ferrule 1110 and optically coupled with the optical fiber wires 114.

Figure 11:
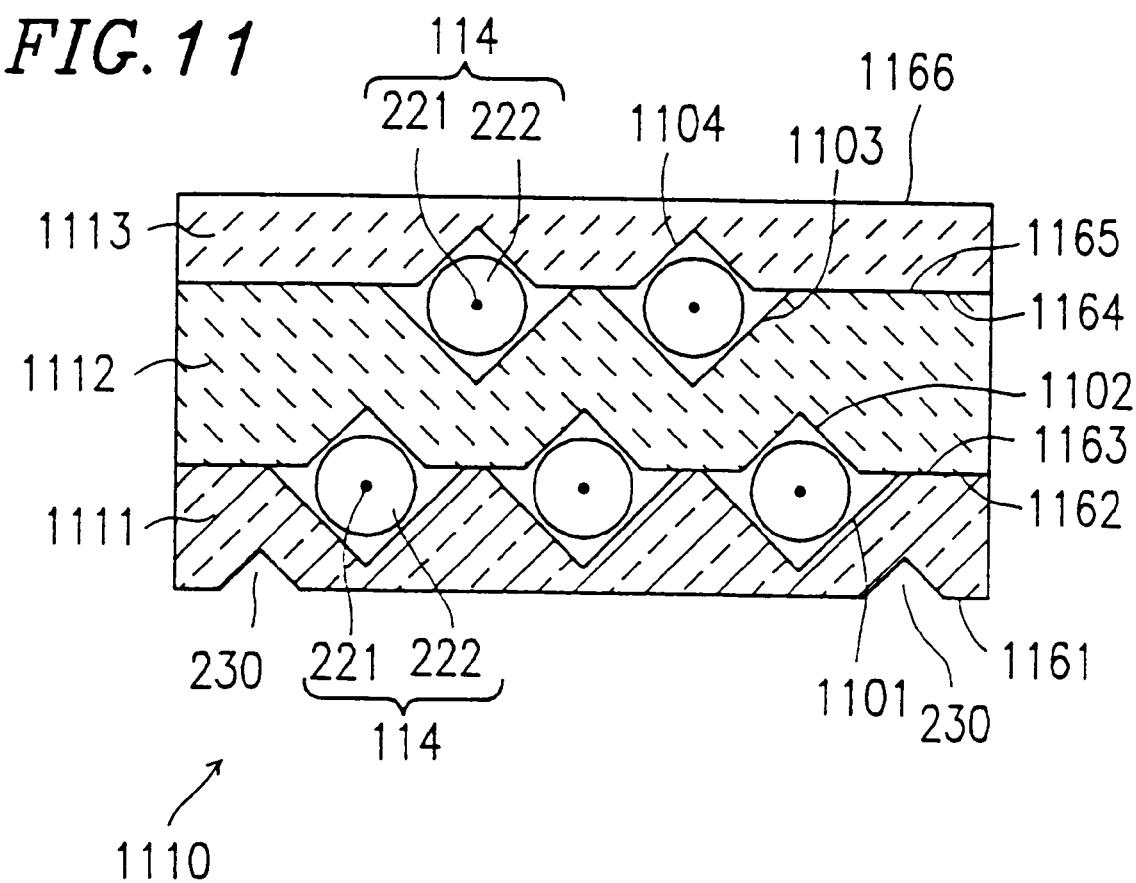
FIG. 11 is a cross-sectional view schematically illustrating the structure of the optical fiber ferrule included in the optical coupling module illustrated in FIG. 10.

Next, the optical fiber array ferrule 1110 will be described in detail with reference to FIG. 11. FIG. 11 is a cross-sectional view of the optical fiber array ferrule 1110. The same constituent elements described previously are designated by the same reference numerals, and the descriptions therefor are omitted.

The first support member 1111 has a first lower surface 1161 and a first upper surface 1162 which are parallel to each other. The first upper surface 1162 is provided with a first group 1101 of V grooves including a plurality of V grooves formed parallel to each other with a spacing of about 250 $\mu$m, each V groove having a width of about 240 82 m, a depth of about 120 $\mu$m and a bottom angle of approximately 90 degrees. A distance between the first lower surface 1161 and the first upper surface 1162 (i.e., the thickness of the first support member 1111) is about 200 $\mu$m. Furthermore, the optical fiber wires 114, each of which includes a core 221 and a cladding 222 surrounding the core 221, are disposed in the V grooves of the first group of V grooves 1101.

The second support member 1112 has a second lower surface 1163 and a second upper surface 1164 which are parallel to each other. The second lower surface 1163 is provided with a second group 1102 of V grooves including a plurality of V grooves formed parallel to each other with a spacing of about 250 $\mu$m, each V groove having a width of about 120 $\mu$m, a depth of about 60 $\mu$m and a bottom angle of approximately 90 degrees. Moreover, the second upper surface 1164 is provided with a third group 1103 of V grooves including a plurality of V grooves formed parallel to each other with a spacing of about 250 $\mu$m, each V groove having a width of about 240 $\mu$m, a depth of about 120 $\mu$m and a bottom angle of approximately 90 degrees. Furthermore, the optical fiber wires 114, each of which includes a core 221 and a cladding 222 surrounding the core 221, are disposed in the V grooves of the third group 1103.

The V grooves in the second group 1102 and the V grooves in the third group 1103 are not opposed to each other, but each of the V grooves in the third group 1103 is provided between the positions corresponding to the two V grooves in the second group 1102. Thus, it is possible to make the distance between the V grooves on the lower surface and those on the upper surface, i.e., the thickness of the second support member 1112, to be smaller than in the case where the V grooves on the lower surface and those on the upper surface are formed opposing to each other. Specifically, a distance between the second lower surface 1163 and the second upper surface 1164, which corresponds to the thickness of the second support member 1112, is about 200 $\mu$m. Furthermore, a distance between the optical fiber wires 114 disposed on and directly under the second support member 1112 is about 200 $\mu$m.

The third support member 1113 has a third lower surface 1165 and a third upper surface 1166 which are parallel to each other. The third lower surface 1165 is provided with a fourth group 1104 of V grooves including a plurality of V grooves formed parallel to each other with a spacing of about 250 $\mu$m, each V groove having a width of about 120 $\mu$m, a depth of about 60 $\mu$m and a bottom angle of approximately 90 degrees. A distance between the third lower surface 1165 and the third upper surface 1166 (i.e., the thickness of the third support member 1113) is about 150 $\mu$m.

In the optical coupling module 1000 in the present embodiment configured as described above, the positions of the V grooves on the upper and lower surfaces of each support member included in the optical fiber array ferrule 1110 are shifted with each other, thereby making the support member thin. This makes it possible to configure the optical fiber array ferrule 1110 to be thin. As a result, the optical coupling module 1000 can be made small.

Embodiment 4

Figure 12A:
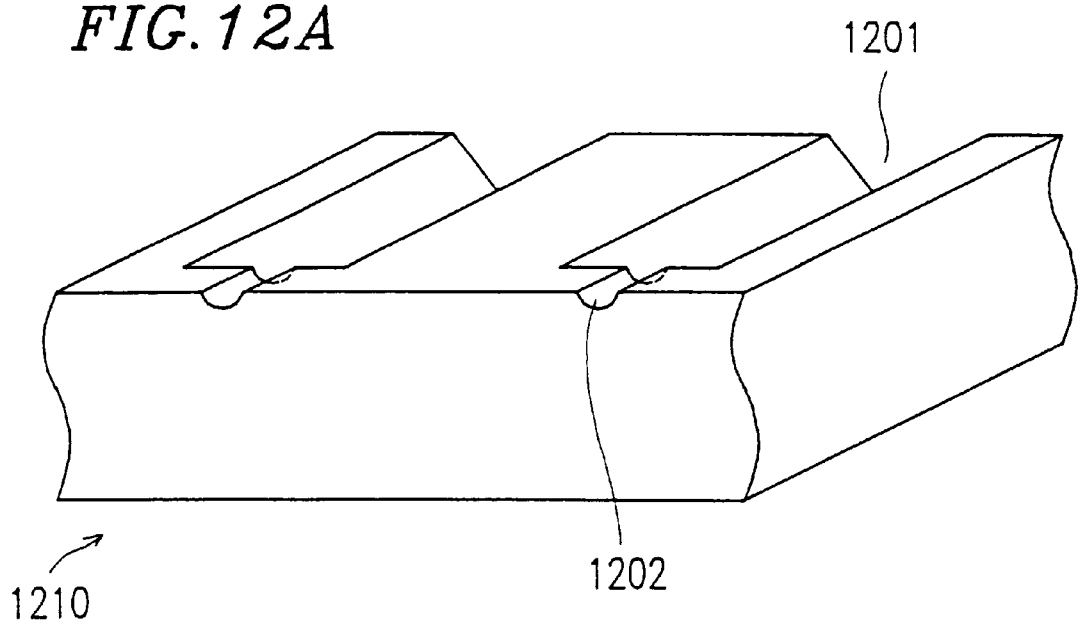
FIG. 12A is a perspective view schematically illustrating the structure of the support member used in the optical fiber array ferrule included in the optical coupling module according to a fourth embodiment of the present invention.
Figure 12B:
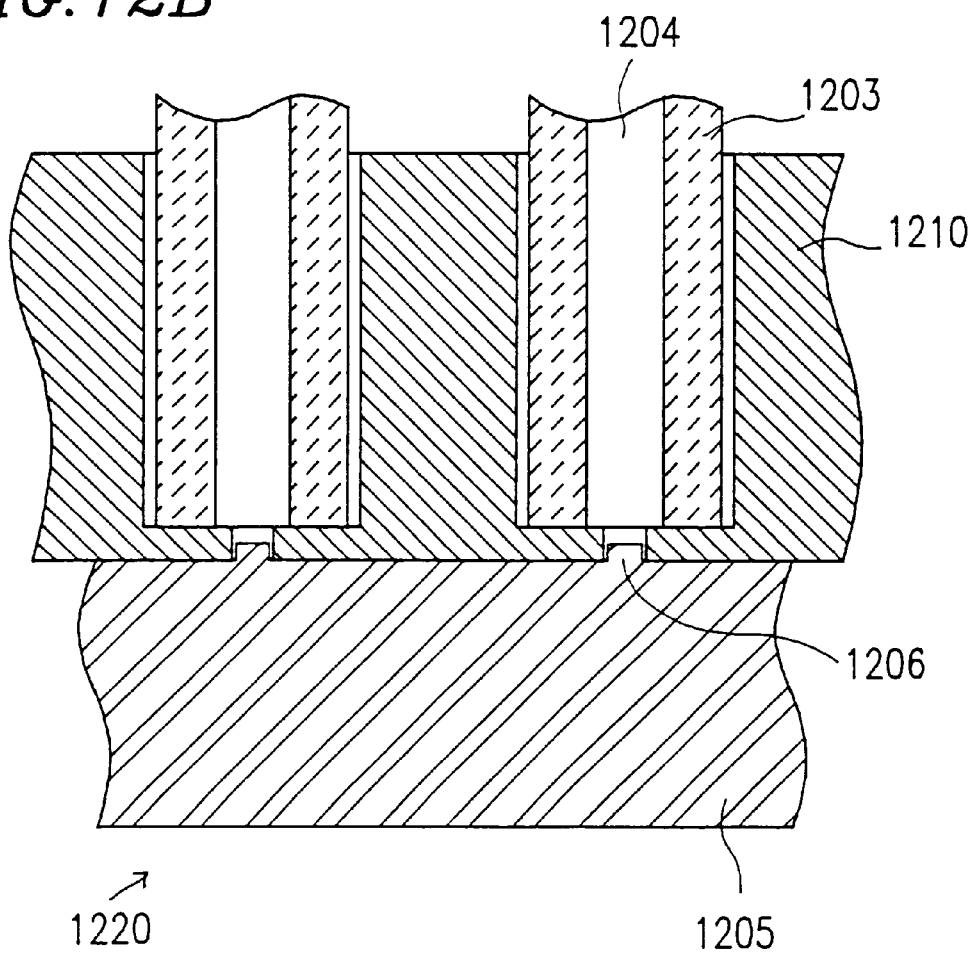
FIG. 12B is a cross-sectional view schematically illustrating the structure of the optical coupling module according to the fourth embodiment of the present invention.
Figure 13:
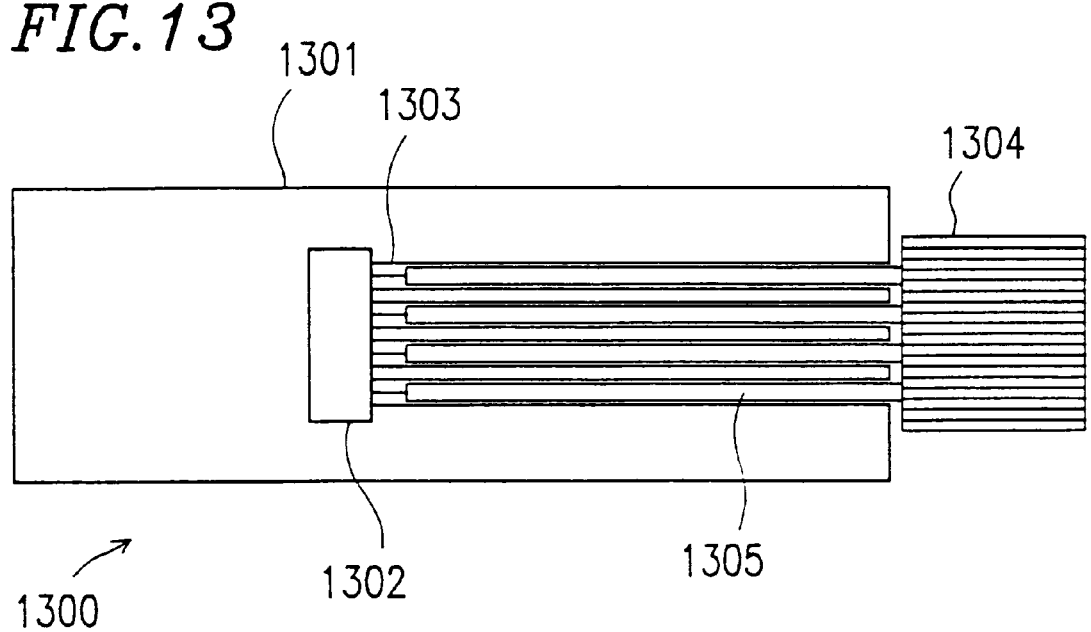
FIG. 13 is a plan view schematically illustrating the structure of a conventional one dimensional optical coupling module.

FIG. 12A is a perspective view schematically illustrating the structure of a support member 1210 constituting an optical fiber array ferrule and FIG. 12B is a cross-sectional view schematically illustrating the structure of an optical coupling module 1220, both according to a fourth embodiment of the present invention.

The support member 1210 illustrated in FIG. 12A differs from the support members in the previous embodiments in that one end of the V groove 1201 has a semicircular groove 1202. The diameter of this semicircular groove 1202 is designed to be slightly larger than the diameter of the mesa 1206 of each surface emitting laser in the surface emitting laser array 1205 (refer to FIG. 12B). As in the previous embodiments, the optical fiber array ferrule is configured by stacking a plurality of support members 1210 with the optical fiber wire 1203 being disposed in each of the V grooves 1201 (refer to FIG. 12B). The optical fiber includes the optical fiber wire 1203 and the jacket (not shown in the figure). Furthermore, the surface emitting laser array 1205 is fixed to the optical fiber array ferrule in such a manner that the mesa 1206 of the surface emitting laser is just fitted into a cylindrical hole formed by the semicircular grooves 1202 when stacking the support members 1210. As a result, the mesa 1206 of the surface emitting laser can be easily and accurately disposed in close proximity of the core 1204 of the optical fiber wire 1203 disposed in the V groove 1201 of the support member 1210.

As described above, the optical coupling module in the present embodiment uses support members which are provided with the semicircular groove at one end of the V groove for constituting the optical fiber array ferrule. The cylindrical hole is then formed by stacking the support members, and the surface emitting laser array is mounted such that the mesa of the surface emitting laser is fitted into the cylindrical hole. This makes it possible to easily and accurately realize a highly efficient optical coupling between the surface emitting laser and the optical fiber.

Embodiment 5

In the optical coupling modules in the first, second, third and fourth embodiments described above, the surface emitting laser array and the optical fiber array ferrule are constructed separately. Therefore, in order to complete the optical coupling module, it is necessary to align their positions when mounting them on the substrate. Moreover, the number of parts constituting the optical coupling module becomes large, resulting in a large number of assembling steps. As already described, the steps of assembling the optical fiber array ferrule, the steps of aligning the surface emitting laser array with the optical fiber array of the optical fiber array ferrule, and the steps of mounting those components on the substrate can be performed easily and accurately according to the present invention. However, if these steps are either simplified or eliminated, then it becomes possible to assemble the optical coupling module more easily.

Hereinafter, an optical coupling module which can accomplish the above-mentioned objective will be described as a fifth embodiment of the present invention.

Figure 14A:
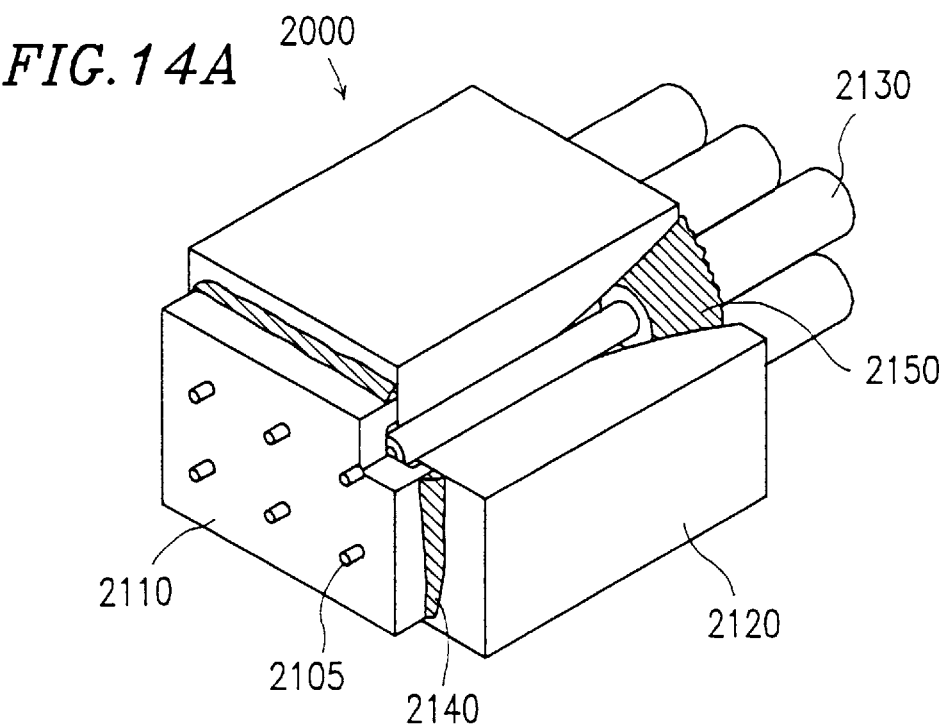
FIG. 14A is a perspective view and FIG. 14B is a cross-sectional view, schematically illustrating the structure of an optical coupling module according to a fifth embodiment of the present invention.
Figure 14B:
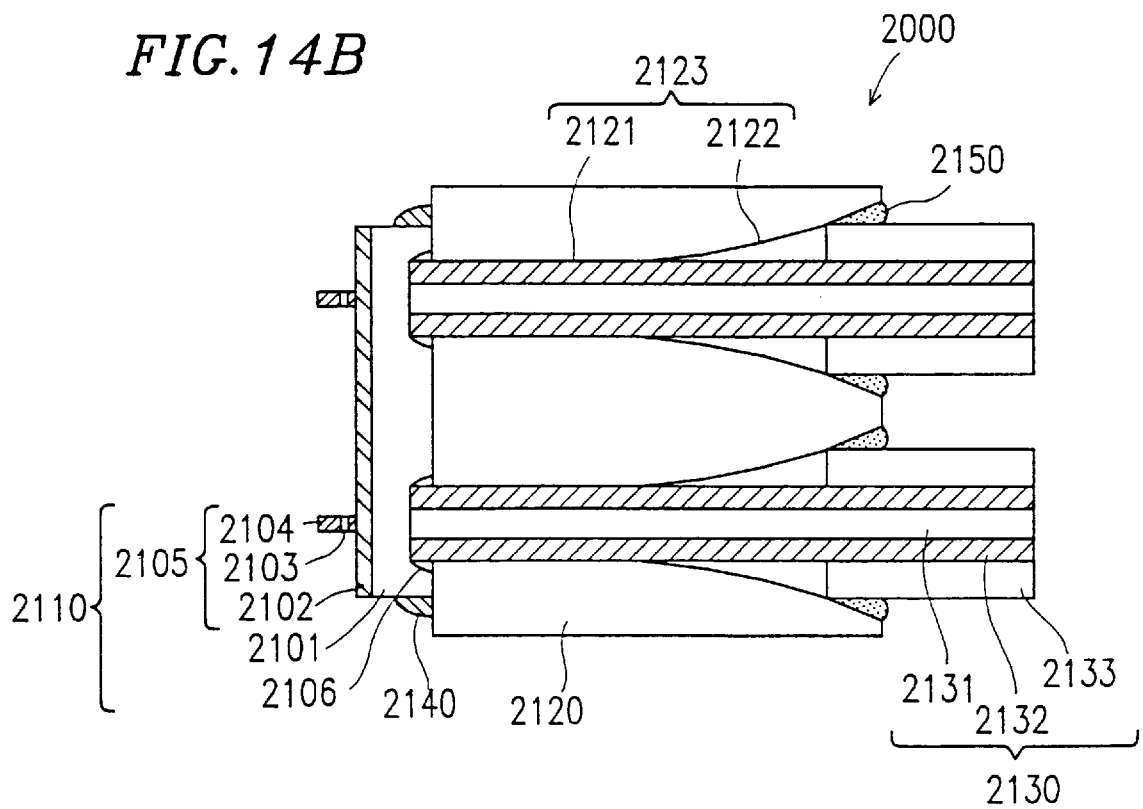

FIG. 14A is a perspective view schematically illustrating the structure of an optical coupling module 2000 according to the fifth embodiment of the present invention, where a portion of the internal structure is also illustrated. FIG. 14B is a cross-sectional view schematically illustrating the structure of the optical coupling module 2000.

The optical coupling module 2000 includes a two-dimensional surface emitting laser array 2110, an optical fiber array ferrule 2120 and optical fibers 2130. The surface emitting laser array 2110 and the optical fiber array ferrule 2120 are put together for one piece with an adhesive agent 2140. The optical fiber array ferrule 2120 and the optical fiber 2130 are joined together with an adhesive agent 2150. As the adhesive agents 2140 and 2150, materials such as epoxy type resin, photocurable resin or the like can be used. The optical fiber array ferrule 2120 is made of metal materials such as aluminum and titanium, ceramic materials such as zirconia and alumina, or semiconductor materials such as silicon.

The optical fiber 2130 includes a core 2131 and a cladding 2132, which constitute an optical fiber wire, and a jacket 2133 protecting the optical fiber wire. The diameter of the optical fiber wire of the optical fiber 2130 (i.e., the outer diameter of the cladding 2132) is about 125 $\mu$m, and the diameter of the core 2131 is about 50 $\mu$m.

The surface emitting laser array 2110 includes six surface emitting laser mesas 2105 arranged in array configuration with a spacing of about 500 $\mu$m, each of which has a diameter of about 30 $\mu$m. Each surface emitting laser mesa 2105 has a layered structure for laser oscillation including a lower semiconductor mirror 2102, an active region 2103 and an upper semiconductor mirror 2104. The lower semiconductor mirror 2102 is formed on the semiconductor substrate 2101, and the active region 2103 is interposed between the lower semiconductor mirror 2102 and the upper semiconductor mirror 2104. Moreover, the rear surface of the semiconductor substrate 2101 is provided with guiding holes 2106 for receiving the optical fiber 2130 at the location corresponding to each surface emitting laser mesa 2105. Each of the guiding holes 2106 has a diameter of about 130 $\mu$m and a depth of about 15 $\mu$m.

The two-dimensional surface emitting laser array 2110 is fixed to the optical fiber ferrule 2120 with the adhesive agent 2140 in the junction-up configuration, i.e., in such a manner that the oscillated laser light is taken out from the rear surface of the substrate 2101. The detailed structure and the production method for the surface emitting laser array 2110 are the same as, for example, those described in the first embodiment, and the descriptions therefor are omitted here.

The optical fiber ferrule 2120 has six guiding holes 2123 for receiving the optical fiber 2130 (to be more precise, the optical fiber wire). Each guiding hole 2123 includes a linear part 2121 for securing the optical fiber 2130 and a tapered part 2122 for guiding the insertion of the optical fiber. The inner diameter at the linear part 2121 of the guiding hole 2123 is about 127 $\mu$m, which is slightly larger than the diameter of the wire of the optical fiber 2130. The tapered part 2122 has a diameter of about 400 $\mu$m at the opening, flaring out so as to facilitate the insertion of the optical fiber into the guiding hole 2123.

Next, production processes for the optical coupling module 2000 will be described with reference to FIGS. 15A, 15B and 15C.

Figure 15A:
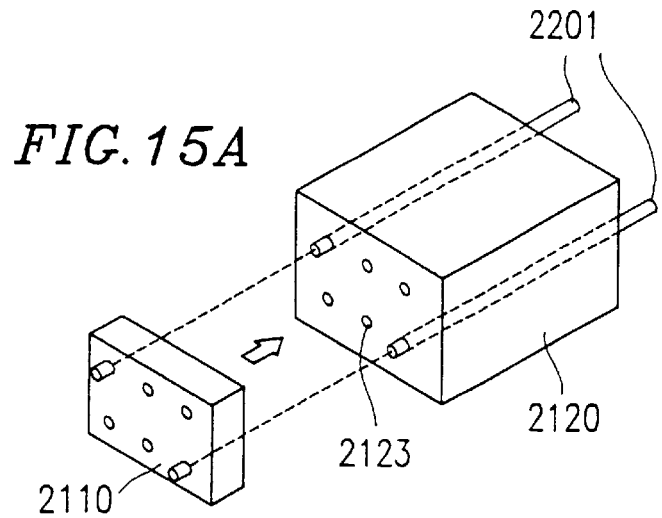
FIGS. 15A to 15C are perspective views for describing the production processes for the optical coupling module illustrated in FIGS. 14A and 14B.

In process (1), as illustrated in FIG. 15A, one guiding rod 2201 each is inserted into two diagonally positioned guiding holes of the six guiding holes 2123 in the optical fiber array ferrule 2120, and the tip of each guiding rod is made to protrude slightly from the face of the optical fiber array ferrule 2120. Then, positions of the two-dimensional surface emitting laser array 2110 and the optical fiber array ferrule 2120 are aligned such that the protruding tips of the guiding rods 2201 are further inserted into the guiding holes 2106 (refer to FIG. 14B) formed on the rear surface of the two-dimensional surface emitting laser array 2110.

Figure 15B:
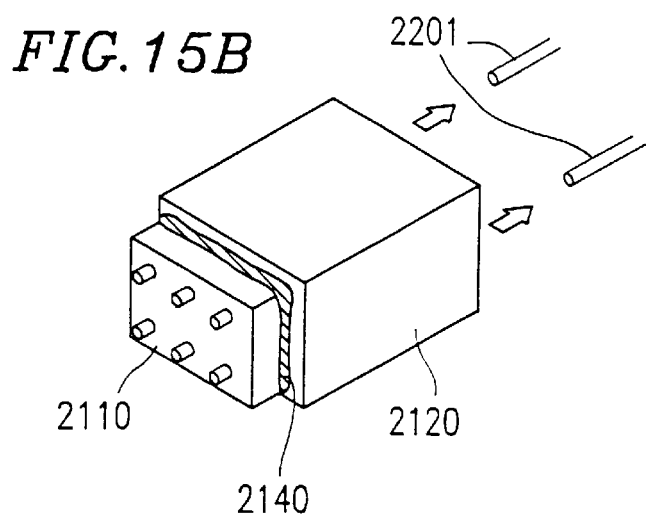

In process (2), as illustrated in FIG. 15B, the two-dimensional surface emitting laser array 2110 and the optical fiber array ferrule 2120 which are in alignment are put together with the adhesive agent 2140. Then, the guiding rods 2201 are removed from the guiding holes.

Figure 15C:
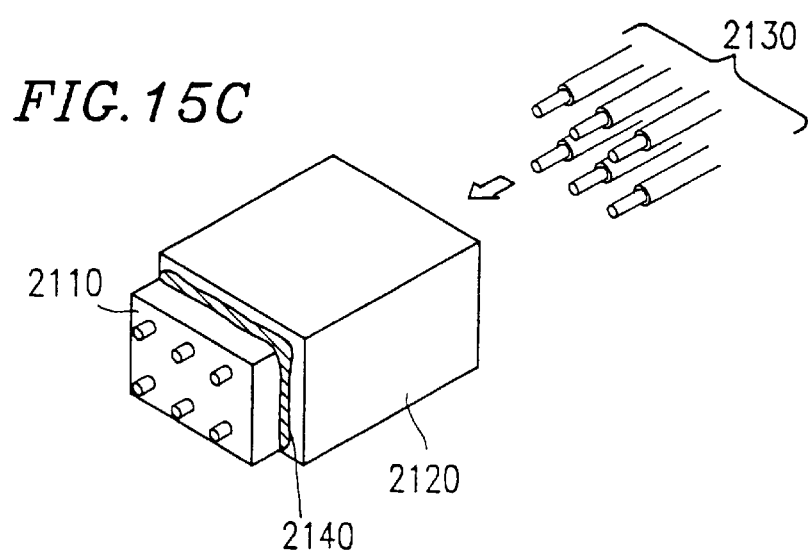

In process (3), as illustrated in FIG. 15C, the optical fiber 2130 (the optical fiber wire, to be more precise) is inserted into each guiding hole of the optical fiber array ferrule 2120 which is fixed to the two-dimensional surface emitting optical fiber array 2110 with the adhesive agent 2140. Then, the optical fibers 2130 and the optical fiber array ferrule 2120 are fixed together with an adhesive agent. This completes the optical coupling module 2000.

In the optical coupling module of the present embodiment having the above-described structure, the number of parts necessary to obtain the two-dimensional optical fiber array and the number of production steps therefor can be reduced by using the optical fiber array ferrule having a plurality of guiding holes formed in two-dimensional configuration. Moreover, by producing the guiding holes on the rear surface of the two-dimensional surface emitting laser array substrate, and by fixing it to the optical fiber array ferrule with an adhesive agent in the junction-up configuration such that they become an integrated piece, efficient optical coupling between the optical fiber and the surface emitting laser can be easily realized. As a result, a highly efficient optical coupling module is realized at a considerably low cost.

Embodiment 6

Figure 16:
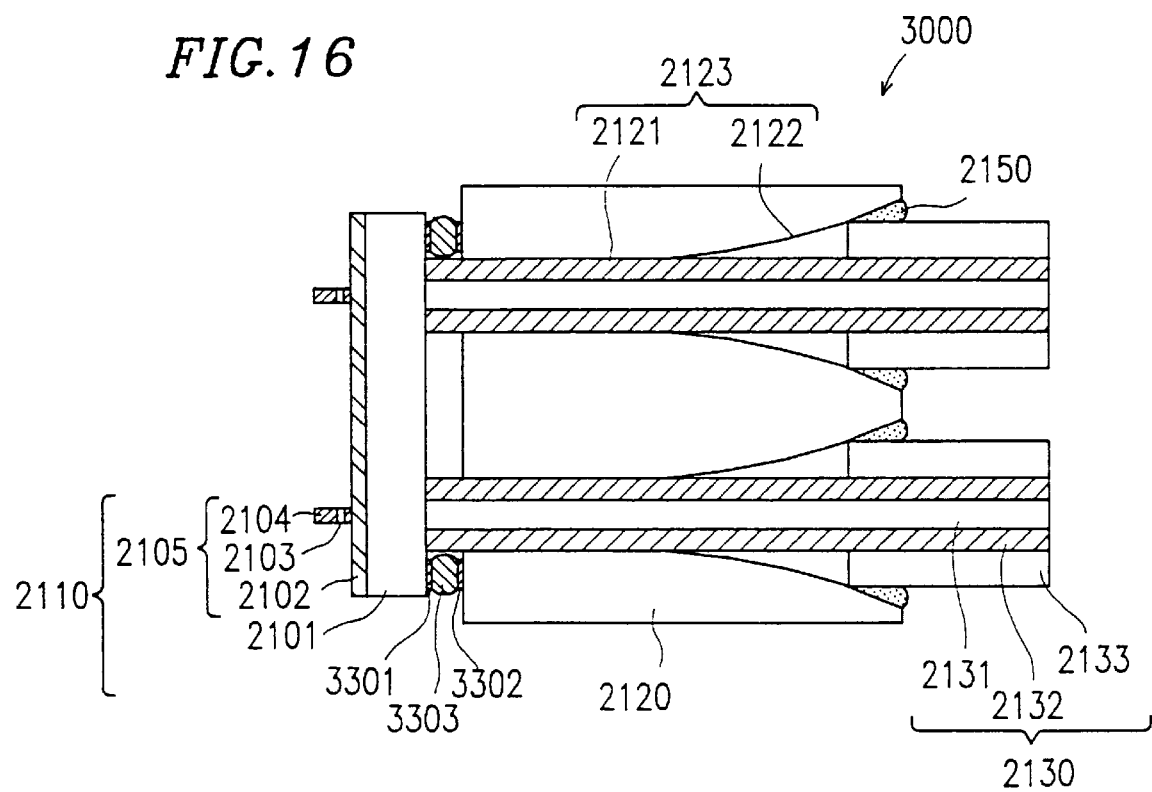
FIG. 16 is a cross-sectional view schematically illustrating the structure of an optical coupling module according to a sixth embodiment of the present invention.

FIG. 16 is a cross-sectional view schematically illustrating the structure of an optical coupling module 3000 according to a sixth embodiment of the present invention. Constituent elements which are the same as those included in the optical coupling module 2000 in the fifth embodiment are designated by the same reference numerals, and the detailed description therefor are omitted.

The optical coupling module 3000 includes a two-dimensional surface emitting laser array 2110, an optical fiber array ferrule 2120 and optical fibers 2130. The optical fiber array ferrule 2120 and the optical fibers 2130 are fixed for one piece with an adhesive agent 2150. The structure of the optical fiber array ferrule 2120 and the structure of the optical fiber 2130 included therein are the same as those in the optical coupling module 2000 in the fifth embodiment.

The fundamental structure of the two-dimensional surface emitting laser array 2110 is also the same as that in the optical coupling module 2000 in the fifth embodiment. However, the guiding holes are not formed on the rear surface of the substrate in the present embodiment.

The adhesion of the two-dimensional surface emitting laser array 2110 and the optical fiber array ferrule 2120 is performed with an indium (In) solder 3303 in a self-aligning manner. Specifically, the bonding surface of the two-dimensional surface emitting laser array 2110 is provided with bonding pads 3301, and the bonding surface of the optical fiber array ferrule 2120 is provided with bonding pads 3302. The bonding pads 3301 and 3302 are formed, for example, by depositing a metal film such as an Au film on the bonding surface. The bonding pads 3301 and 3302 are provided at the corresponding locations so as to form a pair, and are patterned in such a manner that the optical axis of the mesa 2105 of the two-dimensional surface emitting laser array 2110, and the optical axis of the optical fiber 2130 (the optical fiber wire, to be more precise) disposed in the guiding hole 2123 of the optical fiber array ferrule 2120, match with each other when the bonding pad 3301 and the bonding pad 3302 are put together.

The bonding pads 3301 and 3302 can be accurately formed on the order of microns by a method known in the art, such as photolithography. As a result, the positional alignment of the two-dimensional surface emitting laser array 2110 and the optical fiber array ferrule 2120 can be performed with high precision simply by joining together the bonding pads 3301 and 3302 with the In solder 3303. Moreover, even when the positions of the bonding pads 3301 and 3302 are slightly misaligned during the joining step, the accurate positioning can be attained due to the self-aligning function of the In solder 3303.

The positional alignment can also be accomplished as previously described in the second embodiment. That is, the diagonally positioned surface emitting lasers of the two-dimensional surface emitting laser array 2110 are lased, and the output laser light is coupled to the optical fibers 2130 at the corresponding positions. The two-dimensional surface emitting laser array 2110 and the optical fiber array ferrule 2120 are then aligned at the position where the maximum intensity is observed for the output light from the optical fiber 2130.

As described above, in order to obtain the optical coupling module 3000 of the present embodiment, the bonding surface of the laser array 2110 and the bonding surface of the optical fiber array ferrule 2120 are provided with the bonding pads 3301 and 3302, respectively, so that they are bonded together with the In solder 3303. This makes it possible to easily couple the two-dimensional laser array 2110 and the optical fibers 2130 included in the optical fiber array ferrule 2120 with high coupling efficiency without providing the guiding holes on the rear surface of the substrate 2101 of the two-dimensional laser array 2110 as in the fifth embodiment.

Embodiment 7

Figure 17A:
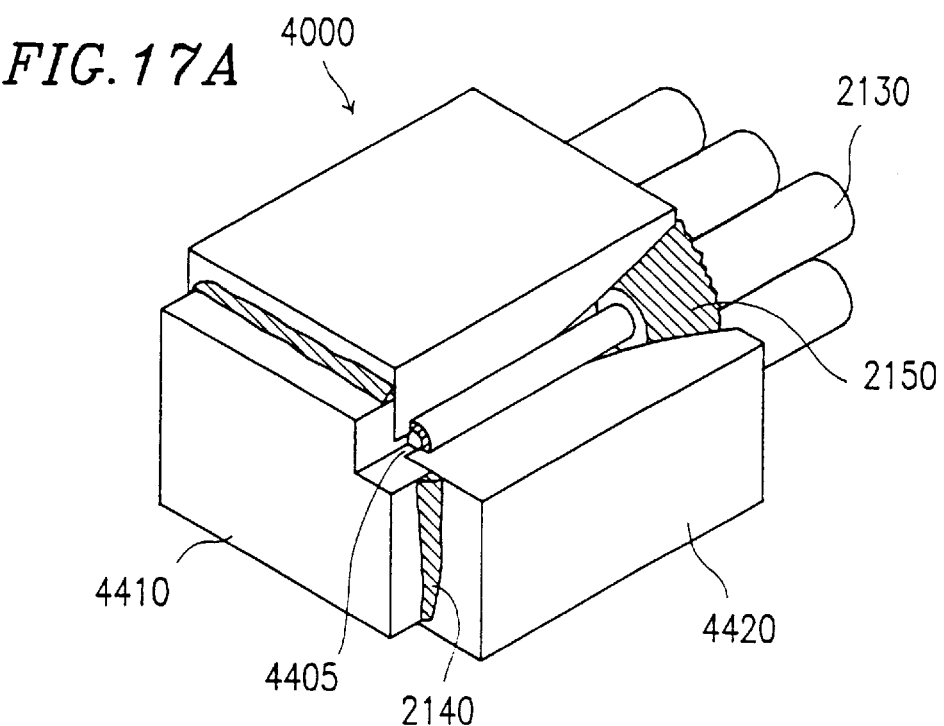
FIG. 17A is a perspective view and FIG. 17B is a cross-sectional view, schematically illustrating the structure of an optical coupling module according to a seventh embodiment of the present invention.
Figure 17B:
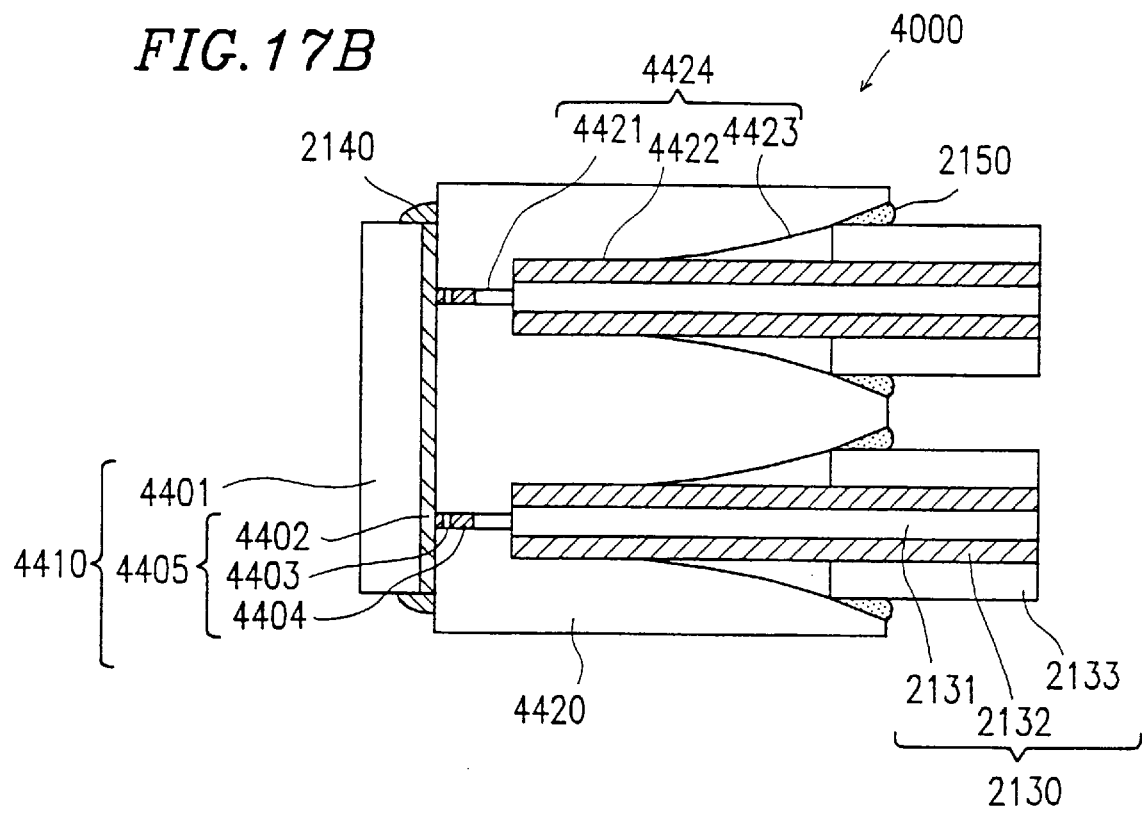

FIG. 17A is a perspective view schematically illustrating the structure of an optical coupling module 4000 according to a seventh embodiment of the present invention, where the inner structure is partially illustrated. FIG. 17B is a cross-sectional view schematically illustrating the structure of the optical coupling module 4000. Constituent elements which are the same as those included in the optical coupling modules 2000 and 3000 in the fifth and sixth embodiment, respectively, are designated by the same reference numerals, and the detailed descriptions therefor are omitted.

The optical coupling module 4000 includes a two-dimensional surface emitting laser array 4410, an optical fiber array ferrule 4420 and optical fibers 2130. The surface emitting laser array 4410 and the optical fiber array ferrule 4420 are put together for one piece with an adhesive agent 2140. The optical fiber array ferrule 4420 and the optical fiber 2130 are joined together with an adhesive agent 2150.

The optical fiber 2130 has the similar structure as in the fifth and sixth embodiments. Specifically, the optical fiber 2130 includes a core 2131 and a cladding 2132, which constitute an optical fiber wire, and a jacket 2133 protecting the optical fiber wire. The diameter of the wire of the optical fiber 2130 (i.e., the outer diameter of the cladding 2132) is about 125 $\mu$m, and the diameter of the core 2131 is about 50 $\mu$m.

The surface emitting laser array 4410 includes six surface emitting laser mesas 4405 arranged in array configuration with a spacing of about 500 $\mu$m, each of which has a diameter of about 30 $\mu$m. Each surface emitting laser mesa 4405 has a layered structure for laser oscillation including a lower semiconductor mirror 4402, an active region 4403 and an upper semiconductor mirror 4404. The lower semiconductor mirror 4402 is formed on the semiconductor substrate 4401, and the active region 4403 is interposed between the lower semiconductor mirror 4402 and the upper semiconductor mirror 4404.

The two-dimensional surface emitting laser array 4410 is fixed to the optical fiber ferrule 4420 with the adhesive agent 2140 in the junction-down configuration, i.e., in such a manner that the oscillated laser light is taken out from the upper surface of the surface emitting laser mesa 4405. The constituting materials and the production method for the surface emitting laser array 4410 can be the same as, for example, those described in the first embodiment, and the descriptions therefor are omitted here.

The optical fiber ferrule 4420 has six guiding holes 4424 for receiving the optical fiber 2130 (the optical fiber wires, to be more precise). Each guiding hole 4424 includes a first linear part 4421 for receiving the surface emitting laser mesa 4405, a second linear part 4422 for securing the optical fiber 2130 and a tapered part 4423 for guiding the insertion of the optical fiber. The inner diameter at the second linear part 4422 of the guiding hole 4424 is about 127 μm, which is slightly larger than the diameter of the wire of the optical fiber 2130. The tapered part 4423 has a diameter of about 400 μm at the opening, flaring out so as to facilitate the insertion of the optical fiber into the guiding hole 4424. Furthermore, the inner diameter of the first linear part 4421 is set at a value slightly larger than the diameter of the surface emitting laser mesa 4405 and slightly smaller than the diameter of the core 2131 of the optical fiber 2130. For example, the inner diameter of the first linear part 4421 is about 35 μm. As illustrated in FIG. 17B, a distance between the surface emitting laser mesa 4405 and the core 2131 of the optical fiber 2130 can be remarkably reduced by inserting the surface emitting laser mesa 4405 into the first linear part 4421 of the guiding hole 4424 provided to the optical fiber array ferrule 4420.

As described above, in the optical coupling module in the present embodiment having the above-described structure, it becomes possible to dispose the surface emitting laser mesa in close proximity of the core of the optical fiber by using the optical fiber array ferrule having the guiding holes for facilitating positioning of the optical fibers, whose end portion is formed so as to receive the surface emitting laser mesa. This makes it possible to easily realize a highly efficient optical coupling between the optical fiber and the surface emitting laser.

Furthermore, the two-dimensional surface emitting laser array 4410 included in the optical coupling module 4000 in the present embodiment has the junction-down structure as described above. The junction-down structure has the light emitting region, i.e., the layered structure for laser oscillation including the active layer 4403, closer to the optical fiber array ferrule 4420 than the junction-up structure employed in the previous embodiment. Since the optical fiber array ferrule 4420 also functions as a heat sink, this configuration facilitates the thermal radiation, and the deterioration in laser characteristics due to thermal saturation is less likely to occur.

Moreover, since the emitted laser light is directly emitted to the outside without passing through the substrate 4401, an absorption of the laser light by the substrate 4401 does not occur. For example, in the two-dimensional surface emitting laser array of the junction-up structure where a GaAs substrate having the optical absorption edge of about 830 nm determined by the energy band structure is used, the light whose wavelength is smaller than about 830 nm is absorbed by the GaAs substrate. This remarkably reduces the utilization efficiency for the emitted laser light. On the other hand, when the two-dimensional surface emitting laser array 4410 of the junction-down structure is used as in the optical coupling module 4000 of the present embodiment, then the surface emitting laser mesa 4405 and the optical fiber 2130 are disposed so as to directly face each other. Therefore, even when the laser light has a wavelength shorter than the optical absorption edge of the substrate material, the laser light can be optically coupled to the optical fiber 2130 without being absorbed by the substrate, thereby resulting in the larger degree of freedom in selecting the wavelength of the laser light to be emitted.

Embodiment 8

Figure 18A:
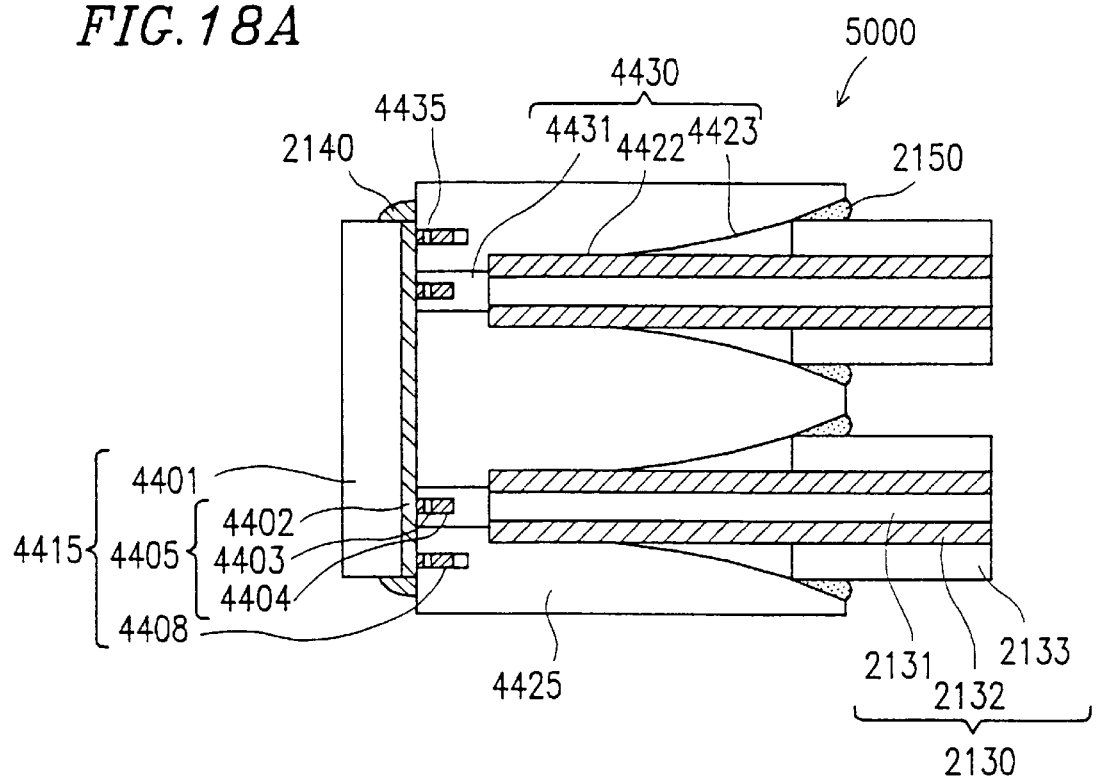
FIG. 18A is a cross-sectional view schematically illustrating the structure of an optical coupling module according to an eighth embodiment of the present invention.
Figure 18B:
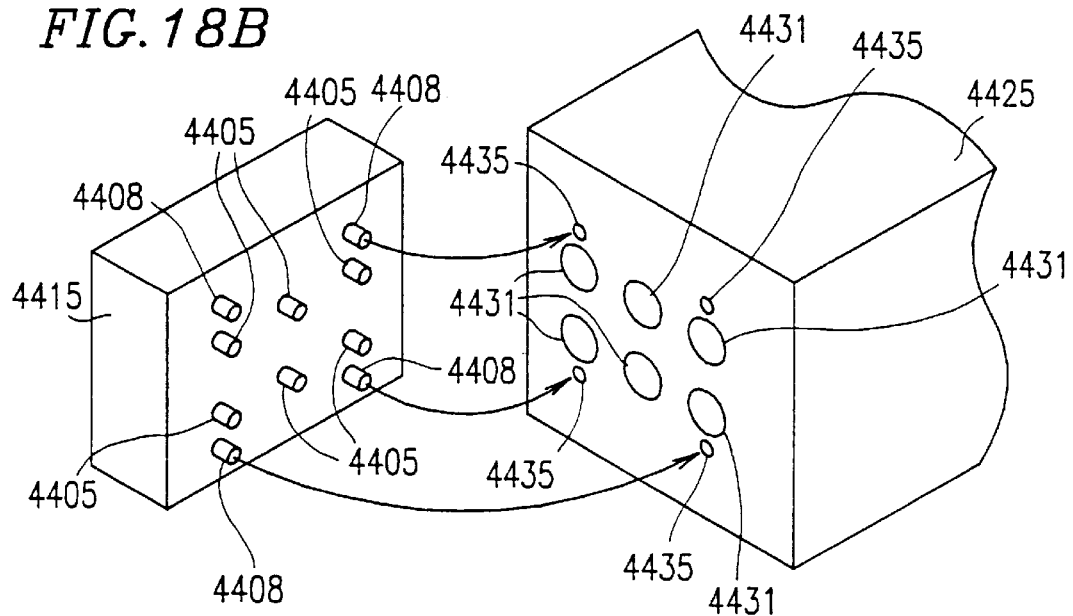
FIG. 18B is a perspective view schematically illustrating the process of combining the two-dimensional surface emitting laser array and the optical fiber array ferrule which are included in the optical coupling module illustrated in FIG. 18A.

FIG. 18A is a cross-sectional view schematically illustrating the structure of an optical coupling module 5000 according to an eighth embodiment of the present invention. FIG. 18B is a perspective view schematically illustrating the step of putting together a two-dimensional surface emitting laser array 4415 and an optical fiber array ferrule 4425, which are included in the optical coupling module 5000. Constituent elements which are the same as those included in the optical coupling module 4000 in the seventh embodiment are designated by the same reference numerals, and the descriptions therefor are omitted.

The optical coupling module 5000 includes a two-dimensional surface emitting laser array 4415, an optical fiber array ferrule 4425 and optical fibers 2130. The surface emitting laser array 4415 and the optical fiber array ferrule 4425 are put together for one piece with an adhesive agent 2140. The optical fiber array ferrule 4425 and the optical fiber 2130 are joined together with an adhesive agent 2150.

The optical fiber 2130 has a similar structure as those described in the fifth, sixth and seventh embodiments. Specifically, the optical fiber 2130 includes a core 2131 and a cladding 2132, which constitute an optical fiber wire, and a jacket 2133 protecting the optical fiber wire. The diameter of the wire of the optical fiber 2130 (i.e., the outer diameter of the cladding 2132) is about 125 μm, and the diameter of the core 2131 is about 50 μm.

The surface emitting laser array 4415 includes six surface emitting laser mesas 4405 arranged in array configuration with a spacing of about 500 μm, each of which has a diameter of about 30 μm. Each surface emitting laser mesa 4405 has a layered structure for laser oscillation including a lower semiconductor mirror 4402, an active region 4403 and an upper semiconductor mirror 4404. The lower semiconductor mirror 4402 is formed on the semiconductor substrate 4401, and the active region 4403 is interposed between the lower semiconductor mirror 4402 and the upper semiconductor mirror 4404.

Furthermore, guiding mesas 4408 are formed on the semiconductor substrate 4401 for positional alignment when the two-dimensional surface emitting laser array 4415 is joined to the optical fiber array ferrule 4425. The guiding mesa 4408 is formed simultaneously with the surface emitting laser mesa 4405 and has a diameter of about 30 μm, which is the same as that of the surface emitting laser mesa 4405. Therefore, the guiding mesa 4408 has the same layered structure as the surface emitting laser mesa 4405.

The two-dimensional surface emitting laser array 4415 is fixed to the optical fiber ferrule 4425 with the adhesive agent 2140 in the junction-down configuration. Constituting materials and production method for the surface emitting laser array 4415 can be made to be the same as, for example, in the first embodiment, and the descriptions therefor are omitted here.

The optical fiber ferrule 4425 has six first guiding holes 4430 for receiving the optical fiber 2130 (the optical fiber wire, to be more precise). Each first guiding hole 4430 includes a first linear part 4431 for receiving the surface emitting laser mesa 4405, a second linear part 4422 for securing the optical fiber 2130 and a tapered part 4423 for guiding the insertion of the optical fiber. The inner diameter at the second linear part 4422 of the first guiding hole 4430 is about 127 μm, which is slightly larger than the diameter of the wire of the optical fiber 2130. The tapered part 4423 has a diameter of about 400 μm at the opening, flaring out so as to facilitate the insertion of the optical fiber into the first guiding hole 4430. Furthermore, the inner diameter of the first linear part 4431 is about 100 μm, which is slightly larger than the diameter of the surface emitting laser mesa 4405. As illustrated in FIG. 18A, a distance between the surface emitting laser mesa 4405 and the core 2131 of the optical fiber 2130 can also be reduced remarkably in this case by inserting the surface emitting laser mesa 4405 into the first linear part 4431 of the first guiding hole 4430 provided to the optical fiber array ferrule 4425.

Furthermore, the optical fiber array ferrule 4425 is provided with second guiding holes 4435 having a diameter of about 35 μm at locations corresponding to the guiding mesas 4408 of the two-dimensional surface emitting laser array 4415. The positional alignment for the optical fiber array ferrule 4425 and the two-dimensional surface emitting laser array 4415 is realized by inserting the guiding mesa 4408 into the second guiding hole 4435 as illustrated by the arrows in FIG. 18B. When this is being done, the surface emitting laser mesa 4405 is inserted into the first linear part 4431 without performing the alignment for the surface emitting laser mesa 4405 and the first linear part 4431 of the first guiding hole 4430 with deliberate care. This makes it easy to align the surface emitting laser mesa 4408 of the surface emitting laser array 4415 with the optical fiber 2130 of the optical fiber array ferrule 4425, thereby reducing the work hours.

Moreover, since the guiding mesas 4408 and the second guiding holes 4435 are provided for the positional alignment, the diameter of the first linear part 4431 at the end of the first guiding hole 4430 for receiving the surface emitting laser mesa 4405 can be set at a value larger than the actual diameter of the surface emitting laser mesa 4405. This prevents the laser mesa 4405 from making contact with the first guiding hole 4430 and being damaged upon inserting the surface emitting laser mesa 4405 to the first guiding hole 4430. Moreover, even when the number of the surface emitting laser mesas 4405 is increased, the positional alignment is only required with respect to the guiding mesas 4408 and the second guiding holes 4435, regardless of the number of the surface emitting laser mesas 4405.

Since the second guiding holes 4435 of the optical fiber array ferrule 4425 can be formed by machining, similarly to the first guiding holes 4430, the number of production steps or the production hours are not particularly increased. Moreover, the guiding mesas 4408 provided to the two-dimensional surface emitting laser array 4415 can be simultaneously formed in the same production step for the surface emitting laser mesa 4405 as described previously. Therefore, the number of production steps is not increased because of the formation of the guiding mesa 4408. Moreover, when the diameter of the guiding mesa 4408 and the diameter of the surface emitting laser mesa 4405 are chosen to be the same as described above, necessary steps such as the patterning can be carried out more easily.

As described above, in the optical coupling module 5000 in the present embodiment, the two-dimensional surface emitting laser array 4415 is provided with the guiding mesas 4408, and the optical fiber array ferrule 4425 is provided with the guiding holes 4435 for receiving the guiding mesas 4408 formed at the locations corresponding to the guiding mesas 4408. Then, using these guiding mesas 4408 and guiding holes 4435, the two-dimensional surface emitting laser array 4415 and the optical fiber array ferrule 4425 are aligned and combined together, thereby easily achieving with high yield, an optical coupling having a high coupling efficiency therebetween.

As described above, according to the present invention, the optical fiber array having optical fibers of two-dimensional array configuration is realized in such a manner that optical coupling with a high coupling efficiency is obtained between the two-dimensional surface emitting laser array and the optical fiber array by using the optical fiber ferrule of the above-described structure.

Moreover, in the case where the surface emitting laser array emitting the laser light in the direction normal to the substrate surface and the optical fiber array in which the optical fibers are arranged in the direction parallel with the substrate are mounted on the same substrate, an optical coupling module which can easily and accurately achieve highly efficient optical coupling is realized between the surface emitting laser array and the optical coupling module.

Alternately, by integrally forming the two-dimensional surface emitting laser array and the above-mentioned optical fiber array ferrule as one piece, optical coupling between each of the optical fibers and corresponding one of the surface emitting lasers can be easily realized with a high coupling efficiency. As a result, an optical coupling module having a high efficiency is realized at a considerably low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical coupling module including an optical fiber array ferrule, said optical fiber array ferrule comprising:
   a plurality of mutually parallel guiding holes;
   a plurality of optical fiber wires, each being disposed in one of said guiding holes, forming a two-dimensional optical fiber array; and
   a surface emitting laser array having a plurality of surface emitting lasers formed on a substrate in a two-dimensional array configuration, wherein said surface emitting laser array and said optical fiber array ferrule are integrally formed as one piece, and said surface emitting lasers of said surface emitting laser array and said guiding holes of said optical fiber array ferrule are formed at positions mutually opposing to each other.

2. An optical coupling module according to claim 1, wherein a beginning end of each of said guiding holes has a tapered shape.

3. An optical coupling module according to claim 1, wherein an inner diameter of each of said guiding holes at a terminating end is smaller than a diameter of the optical fiber wire disposed in said guiding hole.

4. An optical coupling module according to claim 3, wherein an inner diameter of each of said guiding holes at the terminating end is larger than a diameter of a mesa included in each of said surface emitting lasers of said surface emitting laser array.

5. An optical coupling module according to claim 4, wherein said surface emitting laser array is optically coupled to said optical fiber ferrule in a junction-down direction.

6. An optical coupling module according to claim 1, wherein said surface emitting laser array is optically coupled to said optical fiber ferrule in a junction-up direction.

7. An optical coupling module according to claim 6, further comprising a plurality of guiding holes, each being formed on the rear surface of said substrate of said surface emitting laser array at a position corresponding to one of said surface emitting laser.

8. An optical coupling module according to claim 6, further comprising:

first connecting pads formed at least at two locations on a rear surface of said substrate of said surface emitting laser array; and second connecting pads formed at least at two locations on a surface of said optical fiber array ferrule opposing to said surface emitting laser array, wherein said first connecting pads and said second connecting pads are joined together.

9. A method for producing an optical coupling module, comprising the steps of:

forming an optical fiber array ferrule having optical fiber wires disposed in each of a plurality of mutually parallel guiding holes;

preparing a surface emitting laser array having a plurality of surface emitting lasers formed on a substrate in a two-dimensional array configuration;

emitting light from two of the surface emitting lasers of said surface emitting laser array, said two surface emitting lasers being diagonally positioned;

guiding the output laser light from said two surface emitting lasers to two of the optical fiber wires of said optical fiber array ferrule, said two optical fiber wires being at positions corresponding to the two surface emitting lasers;

aligning positions of said surface emitting laser array and said optical fiber array ferrule in such a manner that the output light of said two surface emitting lasers guided to said two optical fiber wires is maximized; and putting for one piece said surface emitting laser array and said optical fiber array ferrule which are aligned.

10. A method for producing an optical coupling module, comprising the steps of:

preparing a surface emitting laser array having a plurality of surface emitting lasers formed on a substrate in a two-dimensional array configuration;

forming a plurality of guiding holes on a rear surface of said substrate of said surface emitting laser array, each of said guiding holes being at positions corresponding to one of said surface emitting lasers;

forming a plurality of mutually parallel guiding holes in a bulk material constituting an optical fiber array ferrule;

inserting two guiding rods respectively to two of the guiding holes of the optical fiber array ferrule, said two guiding holes being diagonally positioned;

further inserting said two guiding rods respectively to two corresponding guiding holes of said surface emitting laser array, and aligning said surface emitting laser array and said optical fiber array ferrule;

putting together for one piece said surface emitting laser array and said optical fiber array ferrule which are aligned;

removing said guiding rods; and inserting optical fiber wires to all of said plurality of guiding holes of said optical fiber array ferrule.

11. A method for producing an optical coupling module, comprising the steps of:

preparing a surface emitting laser array having a plurality of surface emitting lasers formed on a substrate in a two-dimensional array configuration;

forming a plurality of mutually parallel guiding holes in a bulk material constituting an optical fiber array ferrule;

forming first connecting pads by patterning at least at two locations on a rear surface of said substrate of said surface emitting laser array and second connecting pads at least at two locations on a surface of said optical fiber array ferrule opposed to said surface emitting laser array in such a manner that said first and second connecting pads oppose to each other and each of said guiding holes of said optical fiber array ferrule and corresponding one of said surface emitting lasers of said surface emitting laser array oppose to each other; and connecting said first connecting pads and said second connecting pads in a self-aligning manner.

\* \* \* \* \*